United States Patent
Nakai et al.

(10) Patent No.: US 11,499,022 B2
(45) Date of Patent: Nov. 15, 2022

(54) MATERIAL, METHOD FOR PRODUCING THE MATERIAL, PARTIALLY WELDED MATERIAL, COMPOSITE MATERIAL, AND METHOD OF PRODUCING MOLDED PRODUCT

(71) Applicant: Mitsubishi Gas Chemical Company, Inc., Tokyo (JP)

(72) Inventors: Asami Nakai, Gifu (JP); Masataka Kaji, Kahoku (JP); Mitsuro Takagi, Kahoku (JP); Nobuhiko Matsumoto, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 607 days.

(21) Appl. No.: 16/493,521

(22) PCT Filed: Mar. 1, 2018

(86) PCT No.: PCT/JP2018/007757
§ 371 (c)(1),
(2) Date: Sep. 12, 2019

(87) PCT Pub. No.: WO2018/168490
PCT Pub. Date: Sep. 20, 2018

(65) Prior Publication Data
US 2020/0002484 A1    Jan. 2, 2020

(30) Foreign Application Priority Data
Mar. 15, 2017   (JP) .............................. JP2017-049445

(51) Int. Cl.
*C08J 5/04*    (2006.01)
*B29C 70/20*    (2006.01)
(Continued)

(52) U.S. Cl.
CPC ............... *C08J 5/048* (2013.01); *B29C 70/20* (2013.01); *B32B 5/12* (2013.01); *B32B 5/245* (2013.01);
(Continued)

(58) Field of Classification Search
CPC ........... Y10T 156/10; Y10T 428/24994; Y10T 428/31623; Y10T 42/31725;
(Continued)

(56) References Cited

U.S. PATENT DOCUMENTS 6,333,105 B1    12/2001   Tanaka et al.
2013/0062806 A1    3/2013   Mitadera
(Continued)

FOREIGN PATENT DOCUMENTS

CN    104884503 A    9/2015
JP    2000-238142 A    9/2000
(Continued)

OTHER PUBLICATIONS

International Preliminary Report on Patentability and Written Opinion for PCT/JP2018/007757, dated May 22, 2018, and English Translation submitted herewith (10 pages).
(Continued)

*Primary Examiner* — Camie S Thompson
(74) *Attorney, Agent, or Firm* — Fitch, Even, Tabin & Flannery LLP

(57) ABSTRACT

To provide a novel material that maintains suppleness which is the advantage of a material using fibers and has a low thermal shrinkage ratio, and a method for producing the material, a partially welded material using the material, a composite material, and a method for producing a molded product.
A material including: a first region, a fiber region, and a second region continuously in a thickness direction; the first
(Continued)

region and the second region being each independently a resin layer including from 20 to 100 mass % of a thermoplastic resin component and from 80 to 0 mass % of reinforcing fibers; the fiber region including from 20 to 100 mass % of thermoplastic resin fibers and from 80 to 0 mass % of reinforcing fibers; the thermoplastic resin component included in the first region and the thermoplastic resin component included in the second region each independently having a crystallization energy during temperature increase of 2 J/g or greater, measured by differential scanning calorimetry; and the thermoplastic resin fibers included in the fiber region having a crystallization energy during temperature increase of less than 1 J/g, measured by differential scanning calorimetry; wherein the crystallization energy during temperature increase is a value measured by using a differential scanning calorimeter (DSC) in a nitrogen stream while heating is performed from 25° C. to a temperature that is 20° C. higher than a melting point of the thermoplastic resin component or the thermoplastic resin fibers at a temperature increase rate of 10° C./min.

20 Claims, 8 Drawing Sheets

(51) Int. Cl.
| | |
|---|---|
| B32B 5/12 | (2006.01) |
| B32B 5/24 | (2006.01) |
| C08G 69/28 | (2006.01) |
| D02G 3/04 | (2006.01) |
| D02G 3/44 | (2006.01) |
| C08J 5/24 | (2006.01) |
| B29K 77/00 | (2006.01) |
| B29K 307/04 | (2006.01) |
| B29K 309/08 | (2006.01) |

(52) U.S. Cl.
CPC .............. *C08G 69/28* (2013.01); *C08J 5/042* (2013.01); *C08J 5/046* (2013.01); *C08J 5/246* (2021.05); *C08J 5/247* (2021.05); *D02G 3/04* (2013.01); *D02G 3/44* (2013.01); *B29K 2077/00* (2013.01); *B29K 2077/10* (2013.01); *B29K 2307/04* (2013.01); *B29K 2309/08* (2013.01); *B32B 2262/0261* (2013.01); *B32B 2262/0269* (2013.01); *B32B 2262/101* (2013.01); *B32B 2262/106* (2013.01); *D10B 2101/06* (2013.01); *D10B 2101/12* (2013.01); *D10B 2331/02* (2013.01); *D10B 2331/021* (2013.01); *D10B 2505/02* (2013.01)

(58) Field of Classification Search
CPC ... Y10T 428/31739; C08K 7/02; C08L 77/10; C08L 77/00; C08L 77/06; C08L 77/02; B29C 43/204; B29L 2077/10; B29L 2009/00; C08J 2377/00; C08J 2377/06; C08J 5/04; C08J 5/042; C08J 5/18; C08J 5/24; C08J 2377/02; C08J 5/244; C08J 5/243; B65D 65/40; B32B 27/34; B32B 27/08; B32B 27/12; B32B 2260/023; B32B 2260/046; B32B 2262/101; B32B 5/24; B29K 2077/00; B29K 2677/00; B29K 2995/0097; B29K 2507/04; B29K 2509/08; C08G 18/603; C08G 69/26
USPC .................. 524/606; 156/60; 525/525, 418; 264/258, 331.19, 257, 136; 428/297.4, 428/35.7, 474.4, 475.5; 528/335
See application file for complete search history.

(56) References Cited

U.S. PATENT DOCUMENTS

| | | |
|---|---|---|
| 2015/0048539 A1 | 2/2015 | Mitadera |
| 2015/0267050 A1 | 9/2015 | Briffaud et al. |
| 2015/0284886 A1 | 10/2015 | Ohtani et al. |
| 2016/0002832 A1 | 1/2016 | Matsumoto et al. |
| 2016/0010246 A1 | 1/2016 | Nakai et al. |
| 2016/0032082 A1 | 2/2016 | Matsumoto et al. |
| 2017/0260657 A1 | 9/2017 | Nakai et al. |
| 2017/0335107 A1 | 11/2017 | Briffaud et al. |

FOREIGN PATENT DOCUMENTS

| | | |
|---|---|---|
| JP | 2002-500576 A | 1/2002 |
| JP | 2005-052987 A | 3/2005 |
| JP | 2010-260251 A | 11/2010 |
| JP | 2014-173196 A | 9/2014 |
| JP | 2016-056478 A | 4/2016 |
| WO | 98/41398 A1 | 9/1998 |
| WO | 2012/140785 A1 | 10/2012 |
| WO | 2014/061384 A1 | 4/2014 |
| WO | 2014/132775 A1 | 9/2014 |
| WO | 2014/132776 A1 | 9/2014 |
| WO | 2016/039242 A1 | 3/2016 |
| WO | 2016/159340 A1 | 10/2016 |

OTHER PUBLICATIONS

International Search Report for PCT/JP2018/007757, dated May 22, 2018, and English Translation submitted herewith (5 pages).
Extended European Search Report issued in corresponding European Application No. 18768485.7 dated Feb. 24, 2020 (5 pages).
Office Action dated Nov. 13, 2020, in corresponding Chinese Application No. 201880017648.6 (5 pages).

US 11,499,022 B2

MATERIAL, METHOD FOR PRODUCING THE MATERIAL, PARTIALLY WELDED MATERIAL, COMPOSITE MATERIAL, AND METHOD OF PRODUCING MOLDED PRODUCT

CROSS-REFERENCE TO RELATED APPLICATIONS

This application is a U.S. national phase application filed under 35 U.S.C. § 371 of International Application Number PCT/JP2018/007757, filed Mar. 1, 2018, designating the United States, which claims priority from Japanese Application Number 2017-049445, filed Mar. 15, 2017.

FIELD OF THE INVENTION

The present invention relates to a material, a method for producing the material, a partially welded material, a composite material, and a method for producing a molded product.

BACKGROUND OF THE INVENTION

Thermoplastic resins are widely used as various microwave forming materials. In recent years, the use of fibrous thermoplastic resins (thermoplastic resin fibers) as various microwave forming materials has also been investigated. In particular, commingled yarn including continuous reinforcing fibers in thermoplastic resin fibers is also known for improving the strength of a molded product (Patent Document 1).

CITATION LIST

Patent Literature

Patent Document 1: JP 2014-173196 A

SUMMARY OF INVENTION

Fibrous materials such as those described above are supple and have excellent operability, but there is a problem in that the thermoplastic resin fibers shrink during microwave forming. In particular, in a case where thermoplastic resin fibers are molded with reinforcing fibers, such as the case of the commingled yarn described above, the thermoplastic resin fibers have a thermal shrinkage ratio that differs from the thermal shrinkage ratio of the reinforcing fibers, which tends to be more problematic.

The present invention is to solve the problems described above, and an object of the present invention is to provide a novel material that maintains suppleness which is the advantage of a material using thermoplastic resin fibers and has a low thermal shrinkage ratio, and a method for producing the material, a partially welded material using the material, a composite material, and a method for producing a molded product.

As a result of the investigation performed by the present inventors, the above problems were solved by the following means (1), and preferably by (2) to (21).

(1) A material including: a first region, a fiber region, and a second region continuously in a thickness direction; the first region and the second region being each independently a resin layer including from 20 to 100 mass % of a thermoplastic resin component and from 80 to 0 mass % of reinforcing fibers; the fiber region including from 20 to 100 mass % of thermoplastic resin fibers and from 80 to 0 mass % of reinforcing fibers; the thermoplastic resin component included in the first region and the thermoplastic resin component included in the second region each independently having a crystallization energy during temperature increase of 2 J/g or greater, measured by differential scanning calorimetry; the thermoplastic resin fibers included in the fiber region having a crystallization energy during temperature increase of less than 1 J/g, measured by differential scanning calorimetry; wherein the crystallization energy during temperature increase is a value measured by using a differential scanning calorimeter (DSC) in a nitrogen stream while heating is performed from 25° C. to a temperature that is 20° C. higher than a melting point of the thermoplastic resin component or the thermoplastic resin fibers at a temperature increase rate of 10° C./min.

(2) The material according to (1), wherein 80 mass % or greater of compositions of the thermoplastic resin component included in the first region, the thermoplastic resin component included in the second region, and the thermoplastic resin fibers included in the fiber region are identical to each other.

(3) The material according to (1) or (2), wherein the thermoplastic resin component included in the first region, the thermoplastic resin component included in the second region, and the thermoplastic resin fibers included in the fiber region each independently include a polyamide resin.

(4) The material according to (1) or (2), wherein the thermoplastic resin component included in the first region, the thermoplastic resin component included in the second region, and the thermoplastic resin fibers included in the fiber region each independently include a polyamide resin including a constituent unit derived from diamine and a constituent unit derived from dicarboxylic acid, and 50 mol % or greater of the constituent unit derived from diamine is derived from xylylenediamine.

(5) The material according to any one of (1) to (4), wherein the fiber region includes from 25 to 80 mass % of thermoplastic resin fibers and from 75 to 20 mass % of reinforcing fibers.

(6) The material according to any one of (1) to (4), wherein the first region, the second region, and the fiber region each independently include from 25 to 80 mass % of a thermoplastic resin component and from 75 to 20 mass % of reinforcing fibers.

(7) The material according to (6), wherein a difference in mass portion among the reinforcing fibers included in the first region, the second region, and the fiber region is 5 mass % or less.

(8) The material according to any one of (5) to (7), wherein the reinforcing fibers include at least one selected from the group consisting of carbon fibers and glass fibers.

(9) The material according to any one of (5) to (8), wherein the reinforcing fibers are continuous reinforcing fibers.

(10) The material according to (9), wherein the fiber region includes commingled yarn including continuous reinforcing fibers and thermoplastic resin fibers.

(11) The material according to (9) or (10), wherein the first region and the second region are formed from commingled yarn including continuous reinforcing fibers and thermoplastic resin fibers.

(12) The material according to any one of (1) to (11), wherein a difference between the crystallization energy during temperature increase of the thermoplastic resin component included in the first region and the crystallization energy during temperature increase of the thermoplastic resin fibers included in the fiber region and a difference between the crystallization energy during temperature increase of the thermoplastic resin component included in the second region and the crystallization energy during temperature increase of the thermoplastic resin fibers included in the fiber region are each independently 3 J/g or greater.

(13) The material according to any one of (1) to (12), wherein a thickness of the fiber region relative to a total thickness of the material is 20% or greater.

(14) The material according to any one of (1) to (13), wherein the material is a material for light forming or a material for microwave forming.

(15) The material according to any one of (1) to (14), wherein a deformation resistance load is 1 N or less, the deformation resistance load being a load applied to the material to pull the material up at a rate of 300 mm/min through a guide that changes a traveling direction of the material by 90 degrees.

(16) The material according to any one of (1) to (15), wherein a thermal shrinkage ratio after heating is performed at a temperature that is 5° C. higher than the melting point of the thermoplastic resin fibers for 1 minute is 1% or less.

(17) The material according to any one of (1) to (16), wherein the material is in a tape shape.

(18) A partially welded material in which at least two materials described in any one of (1) to (17) are partially welded.

(19) A method for producing the material described in any one of (1) to (17), the method including applying ultrasonic vibration on a surface of fibers arranged in at least one direction, the fibers including from 20 to 100 mass % of thermoplastic resin fibers and from 80 to 0 mass % of reinforcing fibers.

(20) A composite material including: the material described in any one of (1) to (17) or the partially welded material described in (18), and a second thermoplastic resin fibers that retain a shape of the material or the partially welded material; wherein the second thermoplastic resin fibers have a melting point that is at least 15° C. higher than a melting point of a thermoplastic resin fibers included in the material or the partially welded material.

(21) A method for producing a molded product, the method including subjecting the material described in any one of (1) to (17), the partially welded material described in (18), or the composite material described in (20) to light forming or microwave forming.

The present invention made it possible to provide a novel material that maintains suppleness which is the advantage of a material using thermoplastic resin fibers and has a low thermal shrinkage ratio, and a method for producing the material, a partially welded material including the material, a composite material, and a method for producing a molded product.

DESCRIPTION OF EMBODIMENTS

The contents of the present invention will be described in detail below. Note that, in the present specification, " . . . to . . . " is used in a sense that includes the numerical values described before and after as the lower limit value and the upper limit value.

The present invention is characterized by a material including: a first region, a fiber region, and a second region continuously in a thickness direction; the first region and the second region being each independently a resin layer including from 20 to 100 mass % of a thermoplastic resin component and from 80 to 0 mass % of reinforcing fibers; the fiber region including from 20 to 100 mass % of thermoplastic resin fibers and from 80 to 0 mass % of reinforcing fibers; the thermoplastic resin component included in the first region and the thermoplastic resin component included in the second region each independently having a crystallization energy during temperature increase of 2 J/g or greater, measured by differential scanning calorimetry; and the thermoplastic resin fibers included in the fiber region having a crystallization energy during temperature increase of less than 1 J/g, measured by differential scanning calorimetry. Note that, the crystallization energy during temperature increase refers to a value measured by using a differential scanning calorimeter (DSC) in a nitrogen stream while heating is performed from 25° C. to a temperature that is 20° C. higher than a melting point of the thermoplastic resin component or the thermoplastic resin fibers at a temperature increase rate of 10° C./min.

Such a material can suppress the shrinkage of the thermoplastic resin while suppleness is maintained. The present invention achieves this as follows: the crystallization energy during temperature increase of the thermoplastic resin component constituting the resin layer (the first region and the second region) of the surface layer is a high; and, in the inner part (the fiber region), the thermoplastic resin is present as a fibrous state and the crystallization energy during temperature increase of the thermoplastic resin fibers included in the fiber region is lower than that of the thermoplastic resin component included in the surface layer. The high crystallization energy during temperature increase of the thermoplastic resin fibers of the surface layer as described above leads to presence of at least a certain amount of amorphous thermoplastic resin fibers in the thermoplastic resin fibers, and thus dimensional change can be suppressed while suppleness is maintained. Furthermore, the first and second regions provided in the surface layer protect the inner fibrous thermoplastic resin, and ensure suppleness and operability.

Configuration

The material according to an embodiment of the present invention has a first region, a fiber region, and a second region continuously in the thickness direction.

Figure 1A:
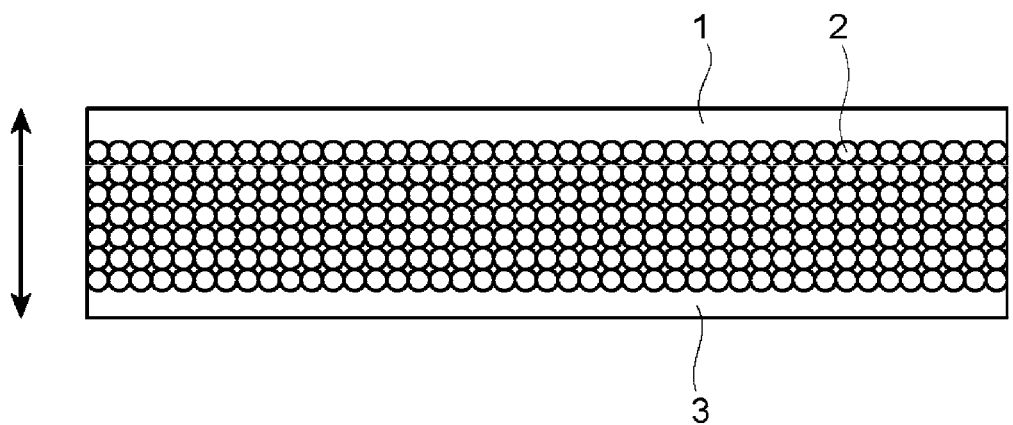
FIGS. 1A and 1B are schematic views of cross sections of materials according to an embodiment of the present invention.

FIG. 1A is a schematic view of a cross section in a case where a material according to an embodiment of the present invention is in a tape shape. Specifically, FIG. 1A is a schematic view of a cross section of a tape-like material in a direction perpendicular to a longitudinal direction. The reference sign 1 represents a first region, the reference sign 2 represents a fiber region, and the reference sign 3 represents a second region. The direction of an arrow in FIG. 1A is a thickness direction.

The first region and the second region are each independently a resin layer that essentially includes a thermoplastic resin component and that may include reinforcing fibers. The resin layer is in a state in which the thermoplastic resin component is melted and forms a layered or film-like region.

Also, the resin layer may include reinforcing fibers, and in a case where the resin layer includes the reinforcing fibers, the thermoplastic resin component is generally impregnated into the reinforcing fibers. In this case, the degree of impregnation of the thermoplastic resin in the resin layer is preferably 70% or greater, and more preferably 90% or greater, in the region from the surface to 20 μm in the thickness direction. The measurement of the degree of impregnation can be performed in consideration of the description of paragraph 0108 of the WO 2016/039242 pamphlet, and the contents thereof are incorporated herein.

The fiber region essentially includes the thermoplastic resin fibers and may include reinforcing fibers.

The first region 1 and the fiber region 2 are continuous in the thickness direction, and there may or may not be a distinct interface between both regions. As an example where there is no distinct interface, a side of the first region close to the fiber region may have a low proportion of the melt thermoplastic resin component. That is, a portion of the thermoplastic resin component may be in a form of fiber or a form similar to fiber without being melt. Furthermore, the fiber region 2 and the second region 3 are also continuous in the thickness direction, and there may or may not be a distinct interface between both regions. In other words, "continuously" means that the first region 1, the fiber region 2, and the second region 3 do not include other regions therebetween, and exist in the thickness direction ceaselessly.

Figure 1B:
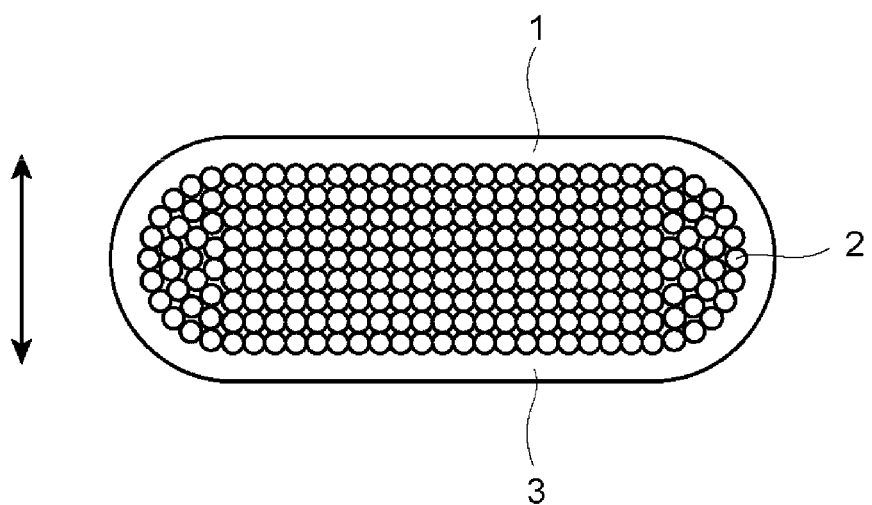

In an embodiment of the present invention, the first region and the second region may be continuous. FIG. 1B is a schematic view of a cross section of a material according to an embodiment of the present invention in a direction perpendicular to the longitudinal direction (fiber length direction) of the material, for an aspect in which the first region and the second region are continuous in the material. The reference signs are the same as those in FIG. 1A. The arrows indicate a thickness direction of the material in FIG. 1B. In an embodiment illustrated in FIG. 1B, surface layers (the first region 1 and the second region 3) are configured to cover an inner part (the fiber region 2). Such a configuration readily improves the handling properties of the material. In an embodiment illustrated in FIG. 1B, the first region and the second region may or may not have a distinct boundary.

The embodiment illustrated in FIG. 1B also describes the material in a tape shape. As illustrated in FIG. 1B, in a case where the cross section is in a shape such as elliptical, and not quadrilateral, the thickest portion in the direction perpendicular to the longitudinal direction of the material is defined as the thickness (total thickness) of the material. In the thickest portion, the first region 1, the fiber region 2, and the second region 3 may be formed.

Note that the ellipse, quadrilateral, and the like in the present specification are not limited to ellipse and quadrilateral in the geometric sense, and it is intended to include shapes that may be interpreted generally as a substantially elliptical shape and a substantially quadrangular shape in the technical field of the present invention.

Figure 2:
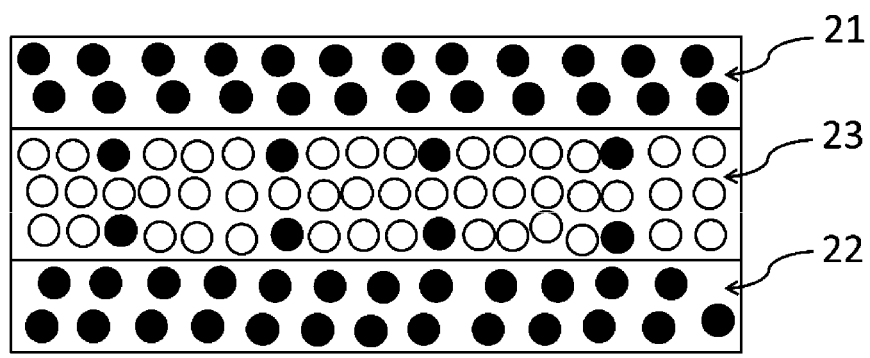
FIG. 2 is a schematic view of a cross section of another example of a material according to an embodiment of the present invention.

FIG. 2 is a schematic view of a cross section of another example where the material according to an embodiment of the present invention is in a tape shape. This is an aspect in which a large amount of the reinforcing fibers are compounded in the resin layer that is a surface layer, and a large amount of the thermoplastic resin fibers are compounded in the fiber region.

In FIG. 2, a solid circle indicates a cross section of the reinforcing fiber, and an open circle indicates a cross section of the thermoplastic resin fiber. Reinforcing fibers are dispersed in the resin layers, which are the first region 21 and the second region 22. In the fiber region 23, there is almost no melted resin, and there are many thermoplastic resin fibers, but there are also some reinforcing fibers in the region near the surface layer (the first region and the second region).

In an embodiment of the present invention, a density of the fiber region is preferably from 1.2 to 6.0, more preferably from 1.5 to 5.0, and even more preferably from 1.8 to 4.5, relative to the theoretical maximum density. The density of the fiber region is within this range, and the material can maintain suppleness and when the material is formed into a roll, a bulge or distortion can be reduced effectively.

The "theoretical maximum density" refers to the density when the fibers are assumed to include no void.

In an embodiment of the present invention, the total thickness of the material is preferably from 10 to 1000 μm, more preferably from 30 to 500 μm, even more preferably from 50 to 250 μm, and yet even more preferably from 100 to 210 μm. With a thickness within this range, the material that is more supple and has a low thermal shrinkage ratio can be obtained.

In the material according to an embodiment of the present invention, the thickness of the fiber region relative to the total thickness of the material is preferably 20% or greater, more preferably 30% or greater, and even more preferably 40% or greater. The upper limit is preferably 90% or less, more preferably 80% or less, and even more preferably 75% or less.

In an embodiment of the present invention, the thickness of the first region and the second region are each preferably from 5 to 100 μm, more preferably from 10 to 90 μm, and even more preferably from 15 to 80 μm. The thicknesses of the first region and the second region are generally approximately the same, but depending on the application and the like, the thickness of one of the regions may be thicker than the thickness of the other region.

In a case where the material according to an embodiment of the present invention is in a tape shape, a length of the tape in the direction perpendicular to the longitudinal direction (fiber length direction), i.e. the width of the tape, is preferably from 1 to 100 mm, more preferably from 2 to 60 mm, and even more preferably from 3 to 40 mm. Furthermore, a length of the tape in the longitudinal direction, i.e. length of the tape, is preferably from 1 to 100000 m, more preferably from 10 to 10000 m, and even more preferably from 80 to 5000 m.

In particular, w/t, which is a relationship between the total thickness of the material (t) and the width of the tape (w), is preferably from 1 to 10000, more preferably from 10 to 500, even more preferably from 10 to 100, yet even more preferably from 20 to 80, and yet even more preferably from 30 to 60. With the relationship within the range as above, a material having better suppleness can be obtained.

In an embodiment of the present invention, as described in detail below, the resin fibers included in the fiber region are preferably continuous thermoplastic resin fibers. Furthermore, the fiber region preferably also includes reinforcing fibers, and the reinforcing fibers are preferably continuous reinforcing fibers. In particular, the fiber region preferably includes commingled yarn including continuous reinforcing fibers and thermoplastic resin fibers (preferably continuous thermoplastic resin fibers). These fibers may be arranged in one direction or arranged in two or more directions, but are preferably arranged in one direction.

Crystallization Energy During Temperature Increase

In an embodiment of the present invention, the thermoplastic resin component included in the first region and the thermoplastic resin component included in the second region each independently have a crystallization energy during temperature increase of 2 J/g or greater, measured by differential scanning calorimetry; and the thermoplastic resin fibers included in the fiber region have a crystallization energy during temperature increase of less than 1 J/g, measured by differential scanning calorimetry.

The crystallization energies during temperature increase of the thermoplastic resin component included in the first region and the thermoplastic resin component included in the second region are each independently 2 J/g or greater, preferably 3 J/g or greater, and more preferably 4 J/g or greater. The upper limit for the crystallization energy during temperature increase is each preferably 40 J/g or less, more preferably 30 J/g or less, and even more preferably 20 J/g or less, and may be 10 J/g or less, or 8 J/g or less.

In an embodiment of the present invention, the thermoplastic resin fibers included in the fiber region has the crystallization energy during temperature increase measured by differential scanning calorimetry of less than 1 J/g, preferably 0.8 J/g or less, and more preferably 0.6 J/g or less. The lower limit for the crystallization energy during temperature increase is preferably 0.0 J/g or greater, more preferably 0.1 J/g or greater, and even more preferably 0.2 J/g or greater.

Furthermore, the difference between the crystallization energy during temperature increase of the thermoplastic resin component included in the first region and the crystallization energy during temperature increase of the thermoplastic resin fibers included in the fiber region and the difference between the crystallization energy during temperature increase of the thermoplastic resin component included in the second region and the crystallization energy during temperature increase of the thermoplastic resin fibers included in the fiber region are preferably each independently 3 J/g or greater, more preferably 4 J/g or greater, even more preferably 4.5 J/g or greater, and yet even more preferably 5 J/g or greater. The upper limit for the difference between the crystallization energies during temperature increase is each preferably 40 J/g or less, more preferably 30 J/g or less, and even more preferably 20 J/g or less, and may be 10 J/g or less, or 8 J/g or less. With the crystallization energies within such ranges, the thermal shrinkage ratio of the material can be further effectively reduced.

The "crystallization energy during temperature increase" refers to a value measured by using a differential scanning calorimeter (DSC) in a nitrogen stream while heating is performed from 25° C. to a temperature that is 20° C. higher than the melting point of the thermoplastic resin component at a temperature increase rate of 10° C./min for the first region and the second region; or refers to a value measured by using a differential scanning calorimeter (DSC) in a nitrogen stream while heating is performed from 25° C. to a temperature that is 20° C. higher than the melting point of the thermoplastic resin fibers at a temperature increase rate of 10° C./min for the fiber region.

Note that the "melting point" in an embodiment of the present invention refers to the temperature, at which the endothermic peak reaches its maximum during temperature increase, observed by the Differential Scanning calorimetry (DSC) method, and specifically refers to the value measured by the method described in examples described below.

More specifically, the measurement is performed in accordance with the method described in examples below. In a case where equipment or the like used in examples is not available due to discontinuation or the like, other equipment having equivalent performance and the like can be used. The same measures may be applied to other measurement methods.

In an embodiment of the present invention, in a case where the thermoplastic resin (the thermoplastic resin component and the thermoplastic resin fibers) is formed from two or more types of resins, the melting point of the resin having a higher melting point is assumed to be the melting point of the thermoplastic resin or the like. Furthermore, in a case where the thermoplastic resin or the like has two or more melting points, the higher melting point is assumed to be the melting point of the thermoplastic resin or the like.

Material Composition

In an embodiment of the present invention, the first region and the second region include each independently from 20 to 100 mass % of the thermoplastic resin component and from 80 to 0 mass % of the reinforcing fibers, preferably from 25 to 80 mass % of the thermoplastic resin component and from 75 to 20 mass % of the reinforcing fibers, more preferably from 30 to 70 mass % of the thermoplastic resin component and from 70 to 30 mass % of the reinforcing fibers, even more preferably from 49 to 30 mass % of the thermoplastic resin component and from 51 to 70 mass % of the reinforcing fibers, and yet even more preferably from 45 to 30 mass % of the thermoplastic resin component and from 55 to 70 mass % of the reinforcing fibers.

The first region and the second region of the material according to an embodiment of the present invention may include another component besides the thermoplastic resin component and the optionally blended reinforcing fibers, but it is preferable that the first region and the second region of the material according to an embodiment of the present invention substantially consist of the thermoplastic resin component and the optionally compounded reinforcing fibers.

Here, "substantially" means that the amount of another component included in each region besides the components described above is 5 mass % or less, preferably 3 mass % or less, and more preferably 1 mass % or less.

In an embodiment of the present invention, the fiber region includes from 20 to 100 mass % of the thermoplastic resin fibers and from 80 to 0 mass % of the reinforcing fibers, preferably from 25 to 80 mass % of the thermoplastic resin fibers and from 75 to 20 mass % of the reinforcing fibers, more preferably from 30 to 70 mass % of the thermoplastic resin fibers and from 70 to 30 mass % of the reinforcing fibers, even more preferably from 49 to 30 mass % of the thermoplastic resin fibers and from 51 to 70 mass % of the reinforcing fibers, and yet even more preferably from 45 to 30 mass % of the thermoplastic resin fibers and from 55 to 70 mass % of the reinforcing fibers.

Furthermore, the fiber region of the material according to an embodiment of the present invention may include a thermoplastic resin component, in which thermoplastic resin fibers are melted, in addition to the thermoplastic resin fibers and the reinforcing fiber component which may be compounded as necessary. Furthermore, the fiber region of the material according to an embodiment of the present invention preferably substantially consists of the thermoplastic resin fibers, the thermoplastic resin component in which thermoplastic resin fibers are melted as an optional component, and the reinforcing fibers which may be compounded as necessary.

Here, "substantially" means that the amount of another component included in each region besides the components described above is 5 mass % or less, preferably 3 mass % or less, and more preferably 1 mass % or less.

Examples of the material according to an embodiment of the present invention include the following aspects.

(1) An aspect in which the first region and the second region are each independently a resin layer including a thermoplastic resin component and reinforcing fibers, and the fiber region is a region including thermoplastic resin fibers.

(2) An aspect in which the first region and the second region are each independently a resin layer including a thermoplastic resin component, and the fiber region is a region including thermoplastic resin fibers and reinforcing fibers.

(3) An aspect in which the first region and the second region are each independently a resin layer including a thermoplastic resin component and reinforcing fibers, and the fiber region is a region including thermoplastic resin fibers and reinforcing fibers.

The material according to an embodiment of the present invention is preferably (3) above. The aspects (1) to (3) above may include components besides those described above; however, each of the regions preferably includes 90 mass % or greater of the components described above relative to the total amount.

The material according to an embodiment of the present invention may include reinforcing fibers in only at least one region selected from the group consisting of the first region, the second region, and the fiber region. With the material of such a configuration, the crystallization energy during temperature increase can be finely adjusted. Additionally, the content of reinforcing fibers of the molded product can be adjusted at the same time.

For example, it is conceivable that a resin layer may be formed while the thermoplastic resin fibers are sandwiched by the commingled yarn described below and the commingled yarn on the both faces are subjected to ultrasonic vibration. With such a material, the degree of the ultrasonic vibration may be adjusted to provide the fiber region which includes only thermoplastic resin fibers, and the first region and the second region which are resin layers including reinforcing fibers. Also, as illustrated in FIG. 2 above, depending on the degree of ultrasonic vibration, a portion of the thermoplastic resin fibers constituting the commingled yarn may not be melted and may remain as it is. Thus, in the first region 21 and the second region 22, the reinforcing fibers (solid circles in FIG. 2) may be present in the resin layers, and in the fiber region 23, there may be a region in which a large amount of the reinforcing fibers is present and a region in which a small amount of or no reinforcing fibers is present while a large amount of the thermoplastic resin fibers is present (open circles in FIG. 2).

The thermoplastic resin fibers used in an embodiment of the present invention are typically formed from a thermoplastic resin component.

In the material according to an embodiment of the present invention, preferably 80 mass % or greater, more preferably 90 mass % or greater, even more preferably 95 mass % or greater, and yet even more preferably 98 mass % or greater, of compositions of the thermoplastic resin component included in the first region, the thermoplastic resin component included in the second region, and the thermoplastic resin fibers included in the fiber region are identical to each other. Including the thermoplastic resin components and the thermoplastic resin fibers within such ranges, a material having excellent dimensional stability during microwave forming can be obtained.

Furthermore, examples of other embodiments of the material of the present invention also include aspects in which the composition of the thermoplastic resin constituting the first region and the composition of the thermoplastic resin constituting the second region are different. Using thermoplastic resins having different compositions allows the first region and the second region to have different functions. An example thereof is an aspect in which the thermoplastic resin component constituting the first region includes a constituent unit derived from diamine and a constituent unit derived from dicarboxylic acid, wherein the thermoplastic resin component constituting the first region includes 70 mass % or greater of the polyamide resin, in which 50 mol % or greater of the constituent unit derived from diamine is derived from xylylenediamine (preferably derived from xylylenediamine including from 0 to 70 mol % of p-xylylenediamine and from 100 to 30 mol % of m-xylylenediamine) and 50 mol % or greater of the constituent unit derived from dicarboxylic acid is derived from sebacic acid; the thermoplastic resin component constituting the second region includes a constituent unit derived from diamine and a constituent unit derived from dicarboxylic acid, wherein the thermoplastic resin component constituting the second region includes 70 mass % or greater of the polyamide resin in which 50 mol % or greater of the constituent unit derived from diamine is derived from xylylenediamine (preferably m-xylylenediamine) and 50 mol % or greater of the constituent unit derived from dicarboxylic acid is derived from adipic acid; and the thermoplastic resin fibers included in the fiber region include a constituent unit derived from diamine and a constituent unit derived from dicarboxylic acid, wherein the thermoplastic resin fibers included in the fiber region include 35 mass % or greater of a polyamide resin in which 50 mol % or greater of the constituent unit derived from diamine is derived from xylylenediamine and 50 mol % or greater of the constituent unit derived from dicarboxylic acid is derived from sebacic acid, and 35 mass % or greater of a polyamide resin in which 50 mol % or greater of the constituent unit derived from diamine is derived from xylylenediamine and 50 mol % or greater of the constituent unit derived from dicarboxylic acid is derived from adipic acid. In a material with such configurations, infiltration of moisture from the outside is effectively suppressed in the first region, and adhesion to metal is enhanced in the second region.

Thermoplastic Resin Component

Next, the thermoplastic resin component included in the first region, the thermoplastic resin component included in the second region, and the thermoplastic resin component constituting the thermoplastic resin fibers will be described.

The thermoplastic resin components each independently include a thermoplastic resin as a main component. The main component refers to the condition where 80 mass % or greater, preferably 90 mass % or greater, and more preferably 95 mass % or greater, of the thermoplastic resin component is a thermoplastic resin.

As the thermoplastic resin, polyolefin resins such as polyethylene and polypropylene, polyamide resins, polyester resins such as polyethylene terephthalate and polybutylene terephthalate, polycarbonate resins, polyoxymethylene resins, polyetherketone resins such as polyether ketones, polyether ether ketones, polyether ketone ketones, and polyether ether ketone ketones, polyether sulfone resins, polyether sulfide resins, thermoplastic polyimide resins such as thermoplastic polyether imides, thermoplastic polyamide imides, wholly aromatic polyimides and semiaromatic polyimides, and the like can be used, and a polyamide resin is preferable. Details of the polyamide resin will be described below. The thermoplastic resin used in an embodiment of the present invention is preferably a crystalline resin.

The thermoplastic resin may be only one type or may be two or more types. The same type of resin such as a polyamide resin may be used.

The thermoplastic resin component used in an embodiment of the present invention includes a thermoplastic resin as a main component and may further include another component.

The thermoplastic resin component used in an embodiment of the present invention may include an elastomer component.

As the elastomer component, for example, known elastomers, such as polyolefin-based elastomers, diene-based elastomers, polystyrene-based elastomers, polyamide-based elastomers, polyester-based elastomers, polyurethane-based elastomers, fluorine-based elastomers, and silicon-based elastomers, can be used. Polyolefin-based elastomers and polystyrene-based elastomers are preferable. As these elastomers, modified elastomers modified with α,β-unsaturated carboxylic acid and acid anhydrides thereof, acrylamide, derivatives thereof, and the like in the presence or absence of a radical initiator are also preferable in order to impart compatibility with the polyamide resin.

In a case where the elastomer component is compounded in the thermoplastic resin component, the compounded amount of the elastomer component is preferably from 5 to 25 mass % of the thermoplastic resin component.

Furthermore, to the extent that the object and effect of the present invention are not impaired, additives, such as fillers other than fibrous fillers, antioxidants, stabilizers such as thermal stabilizers, hydrolysis-resistant improving agents, weather resistant stabilizers, matting agents, UV absorbers, nucleating agents, plasticizers, dispersants, flame retardants, antistatic agents, anti-coloration agents, anti-gelling agents, colorants, release agents, and lubricants, may be added to the thermoplastic resin component used in the present invention. For these details, the description in paragraphs 0130 to 0155 of JP 4894982 B can be taken into consideration, and the contents thereof are incorporated in the present specification. Note that the thermoplastic resin component used in an embodiment of the present invention may include the filler described above, but preferably includes no filler described above. Specifically, this refers to the content of the filler in the thermoplastic resin component being 3 mass % or less.

An example of a preferred embodiment of the thermoplastic resin component used in the present invention is an embodiment in which 80 mass % or greater (preferably 90 mass % or greater, and more preferably 95 mass % or greater) of the thermoplastic resin component is a polyamide resin.

Examples of the polyamide resin used in the present invention include polyamide 4, polyamide 6, polyamide 11, polyamide 12, polyamide 46, polyamide 66, polyamide 610, polyamide 612, poly(hexamethylene terephthalamide) (polyamide 6T), poly(hexamethylene isophthalamide) (polyamide 6I), polyamide 66/6T, polyxylylene adipamide, polyxylylene sebacamide, polyxylylene dodecamide, polyamide 9T, polyamide 9MT, and polyamide 6I/6T.

Among the polyamide resins described above, a polyamide resin including the constituent unit derived from diamine and the constituent unit derived from dicarboxylic acid, 50 mol % or greater of the constituent unit derived from diamine being derived from xylylenediamine (hereinafter, also referred to as "XD-based polyamide"), is preferable from the perspectives of moldability and heat resistance.

Furthermore, in a case where the polyamide resin is a mixture, the proportion of the XD-based polyamide in the polyamide resin is preferably 50 mass % or greater, more preferably 80 mass % or greater, even more preferably 90 mass % or greater, and particularly preferably 95 mass % or greater.

In the XD-based polyamide, preferably 70 mol % or greater, more preferably 80 mol % or greater, even more preferably 90 mol % or greater, and yet even more preferably 95 mol % or greater, of the constituent unit derived from diamine is derived from xylylenediamine, and preferably 50 mol % or greater, more preferably 70 mol % or greater, even more preferably 80 mol % or greater, yet even more preferably 90 mol % or greater, and yet even more preferably 95 mol % or greater, of the constituent unit derived from dicarboxylic acid is derived from α,ω-linear aliphatic dicarboxylic acid preferably having from 4 to 20 carbons.

The xylylenediamine preferably includes at least m-xylylenediamine, more preferably includes from 30 to 100 mol % of m-xylylenediamine and from 70 to 0 mol % of p-xylylenediamine, and even more preferably from 50 to 100 mol % of m-xylylenediamine and from 50 to 0 mol % of p-xylylenediamine.

Examples of the diamine that can be used as a raw material diamine component of the XD-based polyamide, other than m-xylylenediamine and p-xylylenediamine, include aliphatic diamines, such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic ring(s), such as bis(4-aminophenyl)ether, p-phenylenediamine, bis(aminomethyl)naphthalene. One type thereof can be used, or two or more types thereof can be mixed and used.

In a case where a diamine other than xylylenediamine is used as the diamine component, the proportion thereof is less than 50 mol %, preferably 30 mol % or less, more preferably from 1 to 25 mol %, and particularly preferably from 5 to 20 mol %, of the constituent unit derived from diamine.

Examples of the α,ω-linear aliphatic dicarboxylic acid having from 4 to 20 carbons that is preferably used as the raw material dicarboxylic acid component of the polyamide resin include aliphatic dicarboxylic acids, such as succinic acid, glutaric acid, pimelic acid, suberic acid, azelaic acid, adipic acid, sebacic acid, undecanedioic acid, and dodecanedioic acid. One type thereof can be used, or two or more types thereof can be mixed and used. Among these, adipic acid or sebacic acid is preferable, and sebacic acid is particularly preferable, because the melting point of the polyamide resin is in an appropriate range for microwave forming processing.

Examples of the dicarboxylic acid component other than the α,ω-linear aliphatic dicarboxylic acid having from 4 to 20 carbons include phthalic acid compounds, such as isophthalic acid, terephthalic acid, and orthophthalic acid; naphthalene dicarboxylic acid isomers, such as 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type thereof can be used, or two or more types thereof can be mixed and used.

In a case where a dicarboxylic acid other than the α,ω-linear aliphatic dicarboxylic acid having from 4 to 20 carbons is used as the dicarboxylic acid component, use of terephthalic acid and isophthalic acid is preferable from the perspectives of microwave forming processability and barrier properties. The proportions of the terephthalic acid and isophthalic acid are each preferably 30 mol % or less, more preferably from 1 to 30 mol %, and particularly preferably from 5 to 20 mol %, of the constituent unit derived from dicarboxylic acid.

Furthermore, besides the diamine component and the dicarboxylic acid component, lactams such as ε-caprolactam and laurolactam, and aliphatic aminocarboxylic acids such as aminocaproic acid and aminoundecanoic acid can be used as a copolymer component as the component constituting the polyamide resin, to the extent that the effect of the present invention is not impaired.

A number average molecular weight (Mn) of the polyamide resin used in an embodiment of the present invention is preferably from 6000 to 30000, more preferably from 8000 to 28000, even more preferably from 9000 to 26000, yet even more preferably from 10000 to 24000, and yet even more preferably from 11000 to 22000. The polyamide with the number average molecular weight in such a range may improve heat resistance, modulus of elasticity, dimensional stability, and microwave forming processability.

Note that the number average molecular weight (Mn) herein is calculated based on the terminal amino group concentration [NH$_2$] (μeq/g) and the terminal carboxyl group concentration [COOH] (μeq/g) of the polyamide resin, using the following equation.

$$\text{Number average molecular weight(Mn)} = 2000000/([COOH]+[NH_2])$$

For the method for producing the polyamide resin, the description in the paragraphs 0052 to 0053 of JP 2014-173196 A can be taken into consideration, and the contents thereof are incorporated in the present specification.

In an embodiment of the present invention, the melting point of the polyamide resin is preferably from 150 to 310° C., more preferably from 180 to 300° C., and even more preferably from 180 to 250° C.

Furthermore, the glass transition temperature of the polyamide resin is preferably from 50 to 100° C., more preferably from 55 to 100° C., and particularly preferably from 60 to 100° C. The glass transition temperature in this range may improve the heat resistance of the obtained molded product.

The "glass transition temperature" refers to a glass transition temperature measured by, after heating and melting the sample once to eliminate the effect of the thermal history on the crystallinity, increasing the temperature again. For the measurement, for example, DSC-60 available from Shimadzu Corporation may be used to determine the melting point, from the temperature at which the endothermic peak reaches its maximum. The endothermic peak is observed when approximately 1 mg of a sample is heated and melted from the room temperature to a temperature that is equal to or higher than an expected melting point at the temperature increase rate of 10° C./min while nitrogen is streamed at 30 mL/min as the atmosphere gas. Thereafter, the melted polyamide resin is rapidly cooled by dry ice, and then the temperature is increased again to the temperature equal to or higher than the melting point at the rate of 10° C./min to determine the glass transition temperature and the melting point.

Thermoplastic Resin Fibers

Next, the thermoplastic resin fibers used in an embodiment of the present invention are described. The thermoplastic resin fibers used in an embodiment of the present invention are formed from the thermoplastic resin component described above and may be short fibers or continuous fibers. Here, "short fibers" refer to fibers that are 50 mm or less, and "continuous fibers" refer to fibers that are longer than 50 mm. In an embodiment of the present invention, the continuous thermoplastic resin fibers are preferable. An average fiber length of the continuous thermoplastic resin fibers used in an embodiment of the present invention is not particularly limited; however, the average fiber length is preferably in a range from 1 to 100000 m, more preferably in a range from 100 to 10000 m, and even more preferably in a range from 1000 to 5000 m from the perspective of achieving excellent microwave forming processability.

A cross section of the thermoplastic resin fiber in an embodiment of the present invention may be circular or oblate.

One type of thermoplastic resin fibers may be used, or two or more types of thermoplastic resin fibers may be used.

The continuous thermoplastic resin fibers used in an embodiment of the present invention are typically produced by using a continuous thermoplastic resin fiber bundle in which continuous thermoplastic resin fibers are bundled. A total fineness per one fiber of the continuous thermoplastic resin fiber bundle is preferably from 40 to 600 dtex, more preferably from 50 to 500 dtex, and even more preferably from 100 to 400 dtex. Including the continuous thermoplastic resin fibers with such fineness, even better dispersion of the continuous thermoplastic resin fibers within the resulting commingled yarn is achieved. The number of fibers constituting the continuous thermoplastic resin fiber bundle is preferably from 1 to 200 f, more preferably from 5 to 100 f, even more preferably from 10 to 80 f, and particularly preferably from 20 to 50 f. In particular, as described in detail below, in a case where commingled yarn is used to form the material of an embodiment of the present invention, dispersion of the continuous thermoplastic resin fibers may be improved.

A surface of the thermoplastic resin fibers used in an embodiment of the present invention may be preferably treated with a treatment agent. For these details, the description of paragraphs 0064 and 0065 of WO 2016/159340 pamphlet can be taken into consideration, and the contents thereof are incorporated in the present specification.

Reinforcing Fibers

Next, the reinforcing fibers used in an embodiment of the present invention are described. The reinforcing fibers used in an embodiment of the present invention may be short fibers or continuous fibers. Here, "short fibers" refer to fibers that are 50 mm or less, and "continuous fibers" refer to fibers that are longer than 50 mm. In an embodiment of the present invention, continuous reinforcing fibers are preferred. An average fiber length of the continuous reinforcing fibers used in an embodiment of the present invention is not particularly limited; however, the average fiber length is preferably in a range from 1 to 100000 m, more preferably in a range from 100 to 10000 m, and even more preferably in a range from 1000 to 5000 m from the perspective of achieving excellent microwave forming processability.

A cross section of the reinforcing fiber in an embodiment of the present invention may be circular or oblate.

One type of reinforcing fibers may be used, or two or more types of reinforcing fibers may be used.

Examples of the reinforcing fibers used in an embodiment of the present invention include inorganic fibers, such as glass fibers, carbon fibers, alumina fibers, boron fibers, ceramic fibers, and metal fibers (steel fibers and the like); and organic fibers, such as plant fibers (kenaf, bamboo fibers, and the like), aramid fibers, polyoxymethylene fibers, aromatic polyamide fibers, polyparaphenylene benzobisoxazole fibers, and ultra high molecular weight polyethylene fibers. Among these, at least one type of carbon fibers, aramid fibers, or glass fibers is preferably included, at least one type of carbon fibers or glass fibers is more preferably included, and at least one type of carbon fibers is even more preferably included.

As the reinforcing fibers used in an embodiment of the present invention, reinforcing fibers treated with a treatment agent is preferably used. Examples of such a treatment agent include sizing agents and surface treatment agents, and those described in paragraphs 0093 and 0094 of JP 4894982 B are preferably employed. The contents thereof are incorporated in the present specification.

Specifically, the treatment agent used in an embodiment of the present invention is preferably at least one type selected from the group consisting of epoxy resins, urethane resins, silane-based compounds, isocyanate compounds, titanate-based compounds, and polyamide resins, more preferably at least one type selected from the group consisting of epoxy resins, urethane resins, silane coupling agents, water-insoluble polyamide resins, and water-soluble polyamide resins, even more preferably at least one type selected from the group consisting of epoxy resins, urethane resins, water-insoluble polyamide resins, and water-soluble polyamide resins, and yet even more preferably water-soluble polyamide resins.

An amount of the treatment agent is preferably from 0.001 to 1.5 mass %, more preferably from 0.1 to 1.2 mass %, and even more preferably from 0.3 to 1.1 mass %, relative to the amount of the reinforcing fibers.

A known method can be used for the method of treating the reinforcing fibers with the treatment agent. For example, the reinforcing fibers are immersed in a solution in which the treatment agent is dissolved, and the treatment agent is deposited on the surface of the reinforcing fibers. Furthermore, the treatment agent can also be air-blown onto the surface of the reinforcing fibers. Furthermore, reinforcing fibers that have already been treated with the surface treatment agent or treatment agent may be used. Alternatively, surface treatment agents or treatment agents may be washed off from the commercially available products, and then subjected to surface treatment again such that a desired amount of treatment agent may be deposited.

Commingled Yarn

In the material according to an embodiment of the present invention, the fiber region preferably includes commingled yarn including continuous reinforcing fibers and thermoplastic resin fibers. Using commingled yarn can provide a material having excellent microwave forming processability more easily while maintaining suppleness. Furthermore, in the material according to an embodiment of the present invention, the first region and the second region are preferably formed from commingled yarn including continuous reinforcing fibers and thermoplastic resin fibers.

Preferably, the commingled yarn used in an embodiment of the present invention is preferably commingled yarn in which continuous reinforcing fibers and thermoplastic resin fibers are bundled through a treatment agent of at least one of the continuous reinforcing fibers or the thermoplastic resin fibers, and more preferably commingled yarn in which continuous reinforcing fibers and continuous thermoplastic resin fibers are bundled through a treatment agent of at least one of the continuous reinforcing fibers or the continuous thermoplastic resin fibers.

A volume ratio of the thermoplastic resin fibers to the continuous reinforcing fibers in the commingled yarn is preferably from "0.5 to 1.5":"1.5 to 0.5". Furthermore, a proportion of the continuous reinforcing fibers in the commingled yarn is preferably from 55 to 65 mass % in a case where the continuous reinforcing fibers are carbon fibers, and more preferably from 65 to 75 mass % in a case where the continuous reinforcing fibers are glass fibers.

The degree of dispersion of the continuous reinforcing fibers of the commingled yarn is preferably from 60 to 100%, more preferably from 60 to 99%, even more preferably from 63 to 99%, and particularly preferably from 68 to 99%, and may be from 80 to 99%. Using the thermoplastic resin fibers and the continuous reinforcing fibers within such ranges, the thermoplastic resin fibers are easily impregnated into the continuous reinforcing fibers, and voids in the obtained molded product can be further reduced. The degree of dispersion is measured in accordance with the description in paragraph 0090 of WO 2016/159340.

Furthermore, in the commingled yarn, a part of the thermoplastic resin fibers may be impregnated into the continuous reinforcing fibers. The degree of impregnation of the thermoplastic resin fibers is typically preferably 20% or less, more preferably 15% or less, even more preferably 5% or less, and yet even more preferably 3% or less, and may be 1% or less.

The degree of impregnation of the commingled yarn is measured in accordance with the description in paragraph 0091 of WO 2016/159340.

In the commingled yarn used in an embodiment of the present invention, 95 mass % or greater of the fibers constituting the commingled yarn is typically formed from the continuous reinforcing fibers or the thermoplastic resin fibers.

The commingled yarn is typically produced by using a thermoplastic resin fiber bundle and a continuous reinforcing fiber bundle. The total fineness of the fibers used in the production of a single commingled yarn (sum of the total fineness of the thermoplastic resin fibers and the total fineness of the continuous reinforcing fibers used in the production of a single commingled yarn) is preferably from 1000 to 100000 dtex, more preferably from 1500 to 50000 dtex, even more preferably from 2000 to 50000 dtex, and particularly preferably from 3000 to 30000 dtex. In particular, in a case where high fineness continuous carbon fibers are used as the continuous reinforcing fibers, the total fineness of the fibers used in the production of a single commingled yarn is preferably from 20000 to 100000 dtex, more preferably from 3000 to 90000 dtex, even more preferably from 40000 to 80000 dtex, and particularly preferably from 45000 to 75000 dtex. "High fineness continuous fiber" refers to a continuous fiber having a large number of fibers constituting the continuous fiber, and typically refers to a continuous fiber of 50000 for greater.

The total number of fibers used in the production of a single commingled yarn (sum of the number of fibers of the total number of fibers of thermoplastic resin fibers and the total number of fibers of continuous reinforcing fibers) is preferably from 100 to 100000 f, more preferably from 1000 to 100000 f, even more preferably from 1500 to 70000 f, and yet even more preferably from 2000 to 20000 f. Including the fibers within such ranges, the commingled yarn exhibits an improved ability to commingle fibers and also exhibits even better properties and texture as a molded product. Furthermore, the commingled yarn with such a range has a smaller region of biased concentration of one of the fibers and both fibers are likely to be dispersed more homogeneously. In particular, in a case where high fineness continuous carbon fibers are used as the continuous reinforcing fibers, the total of the number of fibers used in the production of a single commingled yarn is preferably from 10000 to 500000 f, more preferably from 20000 to 400000 f, even more preferably from 30000 to 350000 f, and yet even more preferably from 40000 to 300000 f.

The commingled yarn used in an embodiment of the present invention may be twisted. The method of twisting is not particularly limited, and a known method can be used. The number of twists can be set as appropriate according to the type of thermoplastic resin used for the thermoplastic resin fibers, the number of fibers and the fineness of the thermoplastic resin fiber bundle, the type, the number of fibers, and the fineness of continuous reinforcing fibers, and the ratio of the number or the fineness of the thermoplastic resin fibers to the continuous reinforcing fibers. The number of twists can be, for example, from 1 to 200 times/m (fiber length), from 1 to 100 times/m, from 1 to 70 times/m, from 1 to 50 times/m, or from 10 to 30 times/m. Including the commingled yarn with such a configuration, a molded product having superior mechanical strength can be obtained.

The commingled yarn used in an embodiment of the present invention may be folded in the width direction (the direction perpendicular to the longitudinal direction of the material) in a case where the yarn is tape shaped. The method of folding is not particularly limited, and a known method can be employed. The number of folds can be chosen as appropriate according to the type of thermoplastic resin used in the thermoplastic resin fibers, the number of fibers and the fineness of the thermoplastic resin fiber bundle, the type, the number of fibers, and the fineness of continuous reinforcing fibers, and the ratio of the number or the fineness of the thermoplastic resin fibers to the continuous reinforcing fibers. The number of folds can be, for example, from 1 to 10 times, from 1 to 7 times, from 1 to 6 times, from 1 to 5 times, or from 1 to 4 times. Including the commingled yarn with such a configuration, it is possible to retain a minute shape.

Performance of Material

The material according to an embodiment of the present invention is a material that maintains suppleness as described above. The material according to an embodiment of the present invention may have, for example, the deformation resistance load of 1 N or less, furthermore 0.9 N or less, and particularly 0.8 N or less. The lower limit of the deformation resistance load is not particularly limited, but is sufficiently practical even when the load is 0.1 N or greater, for example.

The deformation resistance load is a load applied to the material to pull the material up at a rate of 300 mm/min through a guide that changes a traveling direction of the material by 90 degrees, and is measured in accordance with the method described in examples below.

The material according to an embodiment of the present invention is also a material having a low thermal shrinkage ratio, as described above. In the material according to an embodiment of the present invention, for example, the thermal shrinkage ratio after heating is performed at a temperature that is 5° C. higher than the melting point of the thermoplastic resin fibers for 1 minute is 1% or less, furthermore 0.9% or less, and particularly 0.8% or less. The lower limit of the thermal shrinkage ratio is not particularly limited but is, for example, preferably 0%.

The thermal shrinkage ratio after heating is performed at a temperature that is 5° C. higher than the melting point of the thermoplastic resin fibers for 1 minute is measured in accordance with the method described in examples below.

Method for Producing Material

Next, the method for producing the material in an embodiment of the present invention are described. The method for producing the material according to an embodiment of the present invention is not particularly limited, but the production is preferably performed by the following method.

That is, a first embodiment of the method for producing the material of the present invention is a method including applying ultrasonic vibration on a surface of fibers arranged in at least one direction and including from 20 to 100 mass % of thermoplastic resin fibers and from 80 to 0 mass % of reinforcing fibers. Application of ultrasonic vibration in this manner enables effective melting of the thermoplastic resin fibers in the surface layer and maintaining the thermoplastic resin fibers in the inner part as is as fibers. The fibers may be arranged in one direction or in two or more directions, but is preferably arranged in one direction.

The details of the thermoplastic resin fibers and the reinforcing fibers are synonymous with those described for the materials described above, and the preferred ranges are the same.

In an aspect of the present invention, it is preferable to arrange the commingled yarn in at least one direction and to apply the ultrasonic vibration. According to this aspect, the crystallization energies during temperature increase of the first region and the second region are easily controlled.

In a case where ultrasonic vibration is used, the thermoplastic resin fibers on the surface of the raw material are preferably heated at 100 to 400° C., and more preferably heated at 120 to 350° C. In particular, the thermoplastic resin fibers on the surface of the raw material are preferably heated at a temperature that is 0 to 40° C. higher than the melting point of the thermoplastic resin fibers, and more preferably heated at a temperature that is 5 to 30° C. higher than the melting point of the thermoplastic resin fibers. According to this aspect, the suppleness of the fiber region can be maintained while the first region is effectively impregnated.

An example of the device for applying ultrasonic vibration is the device described in JP 2016-130011 A. That is, an example is a method in which fibers (preferably commingled yarn) arranged in at least one direction are sandwiched between very thin films and subjected to vibration.

Use of Material

The material of the present invention has a low thermal shrinkage ratio while maintaining suppleness, and thus is preferably used in molded products having fine structures and complex shapes.

The material according to an embodiment of the present invention is, for example, preferably used as a material for light forming or a material for microwave forming. Light forming and microwave forming are methods of microwave forming by irradiating a material with light or microwaves from the outside using a mold made of silicone rubber or the like.

Figure 3A:
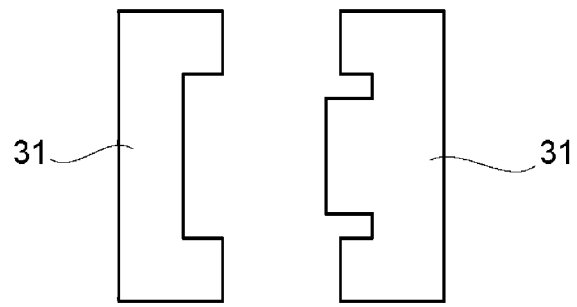
FIGS. 3A to 3C are schematic views illustrating an example of a method of light forming.
Figure 3B:
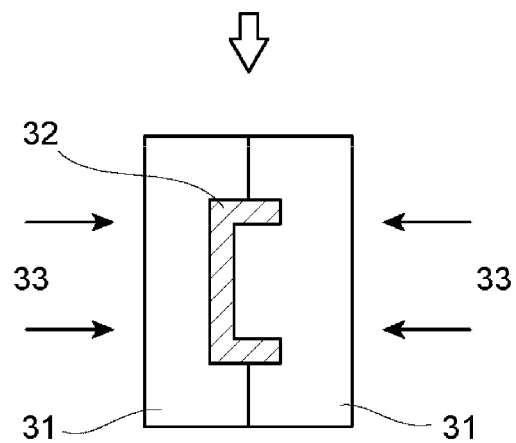
Figure 3C:
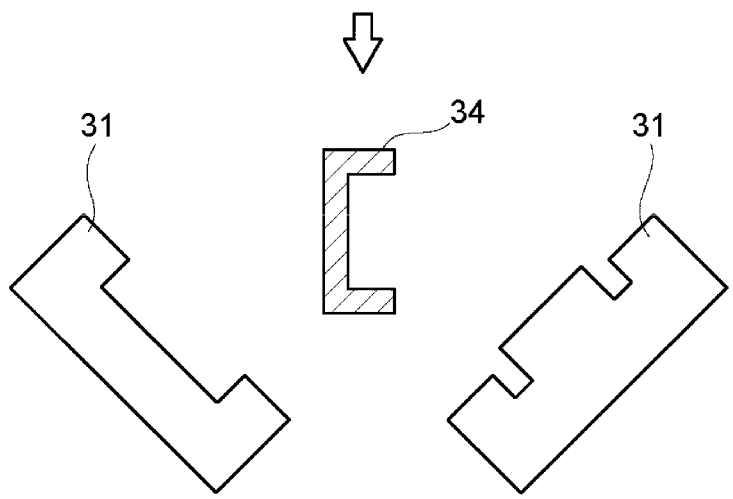

FIGS. 3A to 3C are schematic views illustrating an example of the method of light forming. The reference sign 31 indicates a mold for light forming, the reference sign 32 indicates a material of the present invention, the reference sign 33 indicates light, and the reference sign 34 indicates a molded product formed from the material according to an embodiment of the present invention.

In light forming, as illustrated in FIG. 3A, a mold for light forming is used. The mold for light forming is not particularly limited as long as light is transmitted into the interior of the mold, and a silicone rubber mold or the like is used.

As illustrated in FIG. 3B, the material 32 according to an embodiment of the present invention is placed in the mold 31. The material according to an embodiment of the present invention is supple, and therefore the material can be placed to match a mold having a complex shape and/or fine structural outline. After the material 32 has been placed in the mold 31, inside of the mold is typically evacuated. Application of vacuum in this manner can exert pressure to the material, thereby facilitating impregnation of the thermoplastic resin fibers. Then, the material is irradiated with the light 33 from outside the mold. The light 33 is appropriately chosen from the light that is capable of heating and melting the thermoplastic resin included in the material 32 according to an embodiment of the present invention. A preferable example of the light 33 is infrared light. Then, in a case where vacuum has been applied, after cooling is performed, application of vacuum is terminated, and the mold is removed. The material 32 according to an embodiment of the present invention has a low thermal shrinkage ratio, and therefore, even in a case where the material 32 is molded in such a mold, a molded product 34 in which the shape of the mold is appropriately transferred and reproduced can be obtained.

Meanwhile, microwave forming is a method in which a thermoplastic resin included in a material is heated and melted by using microwaves instead of the infrared light.

For the light forming and the microwave forming, an appropriate method can be selected depending on raw materials and the like. For example, carbon fibers and glass fibers are suitable for light forming, and glass fibers are suitable for microwave forming. In an embodiment of the present invention, the light forming is preferable.

Furthermore, the light forming or the microwave forming may be performed after a composite material described below is molded.

Partially Welded Material

The material according to an embodiment of the present invention may be molded as-is, but the material can also be used as a partially welded material in which two or more of the materials according to an embodiment of the present invention are partially welded.

Figure 8:
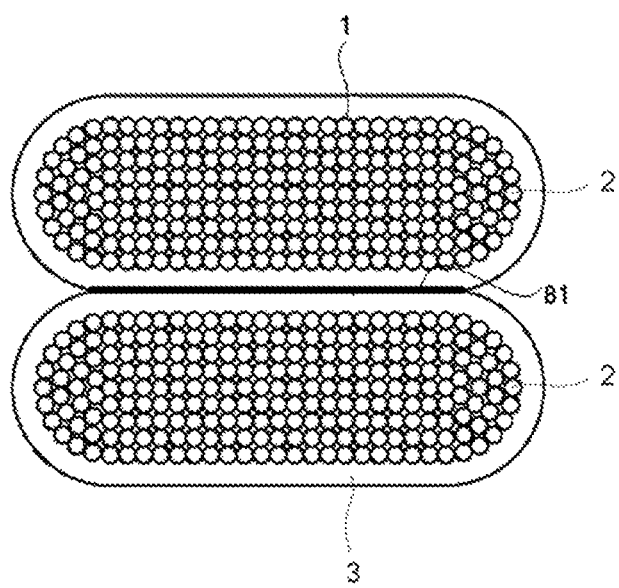
FIG. 8 is a schematic view of a cross section of a partially welded material according to an embodiment of the present invention.

FIG. 8 is a schematic view illustrating a state where the materials according to an embodiment of the present invention, specifically, tape-like materials, are laminated and the layers are partially welded. The reference signs are common with FIGS. 1A and 1B. The reference sign 1 indicates a first region, the reference sign 2 indicates a fiber region, and the reference sign 3 indicates a second region. Furthermore, the reference sign 81 in FIG. 8 indicates a welded portion. Partially welding the materials of the present invention in such a manner can retain the shape of the materials of the target amount with a small number of laminations. And thus, the processing time can be further reduced.

"Partially welded" refers to an aspect in which the materials according to an embodiment of the present invention are welded at a part thereof, preferably are welded at a part of the surface layer and, for example, refers to an aspect in which from 1 to 40% of the surface area of the materials are welded. Furthermore, the number of materials to be welded is preferably from 2 to 10, more preferably from 2 to 7, even more preferably from 2 to 4, and yet even more preferably 2.

Welding is typically thermal welding and, in particular, welding is performed by laser irradiation.

Composite Material

The material according to an embodiment of the present invention may also be a composite material prepared by further providing a coating layer or the like on the surface layers of the material according to an embodiment of the present invention (the first region and the second region), or by retaining the shape of the material according to an embodiment of the present invention by another material.

An example of the embodiments of the composite material of the present invention includes a composite material including the material or the partially welded material according to an embodiment of the present invention and second thermoplastic resin fibers (resin fibers for retaining the shape) that retain the shape of the material, and the melting point of the second thermoplastic resin fibers is at least 15° C. higher than the melting point of thermoplastic resin fibers included in the material. The material and the partially welded material according to an embodiment of the present invention are supple, and thus they are preferably used in embodiments in which the material is folded back or crossed to retain a shape. Furthermore, in an embodiment of the present invention, a molded product having excellent appearance is obtained by retaining the shape by using the second thermoplastic resin fibers having a melting point that is at least 15° C. higher than the melting point of the thermoplastic resin fibers. Furthermore, compared to a case where resins having similar melting points are used for the thermoplastic resin fibers constituting the material according to an embodiment of the present invention and the second thermoplastic resin fibers, a molded product having significantly enhanced mechanical strength and excellent microwave forming processability can be obtained.

The reason for this is presumed as follows: the melting point of the second thermoplastic resin fibers that retain the shape of the commingled yarn is set at least 15° C. higher than the melting point of the thermoplastic resin fibers constituting the material according to an embodiment of the present invention; with such a configuration, the thermoplastic resin constituting the material according to an embodiment of the present invention is melted earlier than the second thermoplastic resin fibers and is appropriately impregnated into the reinforcing fibers at the time of heat processing the composite material of the present invention; and therefore, the composite material according to an embodiment of the present invention can be molded while the degree of dispersion of the reinforcing fibers in the composite material is maintained high, the reinforcing fibers are not disorganized, and the appearance is enhanced. Furthermore, suppressing such disorder of the commingled yarn can also enhance the mechanical strength significantly.

Figure 4:
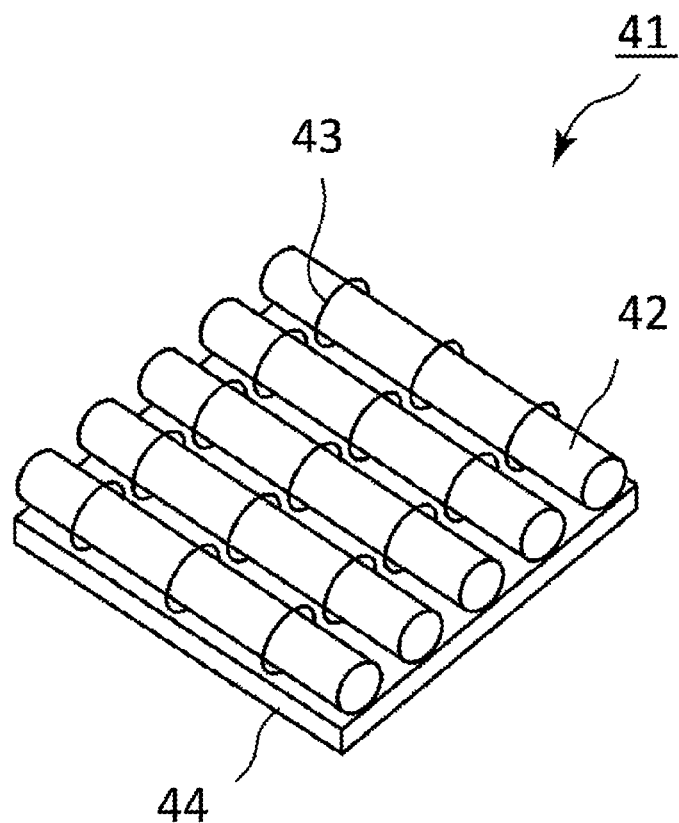
FIG. 4 illustrates an example of a schematic view of a composite material according to an embodiment of the present invention.

FIG. 4 illustrates an example of a schematic view of a composite material according to an embodiment of the present invention. The reference sign 41 indicates a composite material, the reference sign 42 indicates a material according to an embodiment of the present invention, the reference sign 43 indicates a second thermoplastic resin fiber, and the reference sign 44 indicates a thermoplastic resin film.

In the present embodiment, the material 42 according to an embodiment of the present invention is arranged in one direction on the thermoplastic resin film 44, and the shape of the material 42 according to an embodiment of the present invention is retained by stitching with the second thermoplastic resin fibers 43. In FIGS. 3A to 3C, the commingled yarn is aligned in one direction but may be in other arrangements. Examples include the arrangements illustrated in FIGS. 2A to 2C and FIG. 3 of the WO 2016/159340 pamphlet. In the thermoplastic resin film, the melting point of the thermoplastic resin constituting the thermoplastic resin film is preferably at least 15° C. higher than the melting point of the thermoplastic resin fibers included in the material.

Returning to FIG. 4 of the present specification, in the embodiment of FIG. 4, the material 42 according to an embodiment of the present invention is arranged on a substrate (thermoplastic resin film 44), and the shape of the material is retained by the second thermoplastic resin fibers 43. Examples of the retaining method include stitching. Employing such a method facilitates retaining of the shape of the material according to an embodiment of the present invention. However, stitching the material to the substrate is not a requirement as long as the material according to an embodiment of the present invention can be retained in a desired shape. The shape of the material according to an embodiment of the present invention can be retained even without a substrate, for example, by using the second thermoplastic resin fibers only at a portion of the materials according to an embodiment of the present invention intersecting with each other, without stitching the material on a substrate.

Furthermore, the composite material according to an embodiment of the present invention may be a material in which the shape of the partially welded material is retained by the material as illustrated in FIG. 8. The use of the partially welded material allows more materials to be arranged during stitching and is more productive.

The second thermoplastic resin fibers used in an embodiment of the present invention are formed from a thermoplastic resin composition including a thermoplastic resin as a main component. Typically 50 mass % or greater, and preferably 60 mass % or greater, of the thermoplastic resin composition, which is a raw material of the second thermoplastic resin fibers, is a thermoplastic resin, and 70 mass % or greater of the thermoplastic resin composition may be a thermoplastic resin.

As the thermoplastic resin used for the second thermoplastic resin fibers, those used for composite materials can be widely used. The examples thereof include polyolefin resins such as polyethylene and polypropylene, polyamide resins, polyester resins such as polyethylene terephthalate and polybutylene terephthalate, polycarbonate resins, polyoxymethylene resins, polyetherketone resins such as polyether ketones, polyether ether ketones, polyether ketone ketones, and polyether ether ketone ketones, polyether sulfone resins, polyether sulfide resins, and thermoplastic polyimide resins such as thermoplastic polyether imides, thermoplastic polyamide imides, wholly aromatic polyimides, and semiaromatic polyimides. In an embodiment of the present invention, the second thermoplastic resin fibers preferably include a polyamide resin. As specific examples of the polyamide resin, the polyamide resin included in the thermoplastic resin component described above can be preferably employed. Furthermore, the thermoplastic resin composition, which is a raw material of the second thermoplastic resin fibers, may include a component besides the thermoplastic resin, and these are synonymous with those described for the thermoplastic resin component described above, and the preferred ranges are the same.

The melting point of the second thermoplastic resin fibers depends on the type of resin to be used; however, the melting point is preferably from 180 to 405° C., more preferably from 180 to 390° C., even more preferably from 180 to 320° C., yet even more preferably from 190 to 310° C., and yet even more preferably from 200 to 300° C.

In an embodiment of the present invention, as described above, the melting point of the second thermoplastic resin fibers is at least 15° C. higher than the melting point of the thermoplastic resin fibers constituting the material according to an embodiment of the present invention. With such a configuration, the thermoplastic resin fibers constituting the material according to an embodiment of the present invention can be impregnated while the dispersion of the reinforcing fibers remains undisturbed, and the appearance of the obtained molded product is improved.

The difference between the melting point of the second thermoplastic resin fibers and the melting point of the thermoplastic resin fibers included in the material according to an embodiment of the present invention (melting point of the second thermoplastic resin fibers—melting point of the thermoplastic resin fibers included in the material of the present invention) may be 16° C. or greater, 17° C. or greater, or particularly 18° C. or greater. Furthermore, the upper limit for the difference between the melting point of the second thermoplastic resin fibers and the melting point of the thermoplastic resin fibers included in the material according to an embodiment of the present invention is, but not particularly limited to, preferably 100° C. or lower, more preferably 80° C. or lower, and particularly preferably 75° C. or lower. With such a range, during thermoforming, the second thermoplastic resin fibers are also melted after the thermoplastic resin constituting the material according to an embodiment of the present invention has been melted, and the second thermoplastic resin fibers are made less noticeable, and a molded product having a better appearance is obtained.

The difference between the melting point of the resin constituting the thermoplastic resin film described above which is to be the substrate for shape retention (film resin) and the melting point of the thermoplastic resin fibers included in the material according to an embodiment of the present invention (melting point of the film resin—melting point of the thermoplastic resin fibers included in the material of the present invention) may be 16° C. or higher, 17° C. or higher, or particularly 18° C. or higher. Furthermore, the upper limit for the difference between the melting point of the film resin and the melting point of the thermoplastic resin fibers included in the material according to an embodiment of the present invention is, but not particularly limited to, preferably 100° C. or lower, more preferably 80° C. or lower, and particularly preferably 75° C. or lower.

Another example of the embodiments of the composite material of the present invention includes the material according to an embodiment of the present invention and fibers for retaining the shape of the material, and the fiber for retaining the shape is a fiber that does not melt by typical heating (e.g. heating at 320° C. or lower). Examples of such fibers include carbon fibers, glass fibers, aramid resin fibers, modified polyphenylene ether resin fibers, polyetherimide fibers, polyether ether ketone fibers, and polyimide fibers.

The thickness of the composite material according to an embodiment of the present invention may be, for example, from 0.2 to 4 mm.

Production of Molded Product

The present invention discloses a method for producing a molded product, the method including subjecting the material or the composite material according to an embodiment of the present invention to light forming or microwave forming.

An example of the embodiments of the method for producing the molded product according to an embodiment of the present invention is an embodiment where the material or the composite material according to an embodiment of the present invention is placed in a mold for light forming or microwave forming so that the thickness of the material is from 1 to 2 mm and subjected to light forming or microwave forming.

Use of Molded Product

The field of application of the molded product formed by microwave forming the material and the composite material according to an embodiment of the present invention is not particularly limited. Examples thereof include parts for transportation such as automobiles and aircrafts, general mechanical parts, precision mechanical parts, electronic/electrical device parts, OA device parts, building material/building-related components, medical devices, leisure sporting devices, amusements, medical products, household goods such as food packaging films, and defense and aerospace products. In particular, the molded product is suitably used as molded materials for medical equipment (such as long leg brace), window frames for automobiles, trains, and boats, frames for goggle part of helmets, frames for glasses, safety shoes, and the like. In particular, the composite material according to an embodiment of the present invention has a great value when used as a material for forming medical equipment and a secondary structural component for automobiles.

EXAMPLES

The present invention is described more specifically below through examples. The materials, used amounts, proportions, processing contents, processing procedures, and the like described in the examples below may be changed as appropriate, unless the spirit of the present invention is departed. Therefore, the scope of the present invention is not limited to the specific examples described below.

1. Thermoplastic Resin

Synthesis Example 1 MPXD10

In a reaction vessel equipped with a stirrer, a partial condenser, a total condenser, a thermometer, a dropping funnel, a nitrogen introduction tube, and a strand die, 10 kg (49.4 mol) of sebacic acid (TA grade, available from Itoh Oil Chemicals Co., Ltd.) and 11.66 g of sodium acetate/sodium hypophosphite monohydrate (molar ratio=1/1.5) were charged, and after sufficient purge of nitrogen was performed, heating and melting was performed to 170° C. under a small amount of nitrogen stream while the system is agitated.

To the melted sebacic acid, 6.647 kg of a mixed xylylenediamine in which the molar ratio of m-xylylenediamine (available from Mitsubishi Gas Chemical Company, Inc.) and p-xylylenediamine (available from Mitsubishi Gas Chemical Company, Inc.) was 70/30 (34.16 mol of m-xylylenediamine, 14.64 mol of p-xylylenediamine) was added dropwise while agitation is performed. The internal temperature was continuously increased to 240° C. for 2.5 hours while generated condensed water was discharged outside the system.

After dropwise addition was terminated, the internal temperature was increased, and the pressure inside the reaction vessel was reduced when the temperature reached 250° C., and the internal temperature was further increased to continue the melt polycondensation reaction at 255° C. for 20 minutes. Thereafter, the inside of the system was pressurized with nitrogen, and the obtained polymer was removed from the strand die and pelletized to obtain a polyamide resin MPXD10.

The melting point of the obtained polyamide resin was 213° C., and the number average molecular weight was 15400.

Synthesis Example 2 MXD10

A polyamide resin MXD10 was obtained by the same method as in Synthesis Example 1 except for changing the mixed xylylenediamine including m-xylylenediamine and p-xylylenediamine of Synthesis Example 1 to an equivalent amount of m-xylylenediamine.

The melting point of the obtained polyamide resin was 190° C., and the number average molecular weight was 14900.

MXD6: m-xylylene adipamide resin (grade S 6001, available from Mitsubishi Gas Chemical Company, Inc.); melting point: 237° C.; number average molecular weight:

Polyamide 66 fibers for shape retention: Woolly nylon, available from Gunze Ltd.; melting point: 265° C.

Method for Producing Polyamide 66 Film for Shape Retention

Polyamide 66 pellets (CM3001N, available from Toray Industries, Inc.) were fed to a single screw extruder equipped with a T-die with a cylinder diameter of 30 mm (PTM-30, available from PLABOR Research Laboratory of Plastics Technology Co., Ltd.). Melt kneading was performed at a cylinder temperature of 290° C. and a screw rotation speed of 30 rpm. After the melt kneading, a film-like material was extruded through the T-die and solidified on a cooling roll to obtain a film having a thickness of 100 μm. The melting point of the polyamide 66 was 265° C.

Melting Point of Thermoplastic Resin

DSC-60 available from Shimadzu Corporation was used to determine the melting point, from the temperature at which the endothermic peak reached its maximum. The endothermic peak was observed when approximately 1 mg of a sample was heated and melted from the room temperature (25° C.) to a temperature that was equal to or higher than an expected melting point at the temperature increase rate of 10° C./min while nitrogen was streamed at 30 mL/min as the atmosphere gas, then the melted thermoplastic resin was rapidly cooled by dry ice, and the temperature was increased again to a temperature that was equal to or higher than the melting point at the rate of 10° C./min. The melting points of the thermoplastic resin component and the thermoplastic resin fibers were measured in the same manner.

2. Continuous Reinforcing Fibers

Continuous carbon fiber: Pyrofil-TR-50S-12000-AD, available from Mitsubishi Rayon Co., Ltd.; 8000 dtex; number of fibers: 12000 f; surface treated with an epoxy resin.

Continuous glass fibers: ECG 75 1/0 0.7Z, available from Nitto Boseki Co., Ltd.; fineness: 687 dtex; number of fibers: 400 f; surface treated with sizing agent High fineness continuous carbon fibers (high fineness carbon fibers): Pyrofil-TRH50-60M, available from Mitsubishi Rayon Co., Ltd.; 32000 dtex; number of fibers: 60000 f Example 1

Production of Continuous Thermoplastic Resin Fibers

The thermoplastic resin shown in Table 1 below was used to form fibers according to the following method.

The thermoplastic resin was melt-extruded by using a single screw extruder having a 30 mmφ screw, extruded in a strand form from a 60 hole-die, stretched while being wound by a roll in a roll form to obtain a thermoplastic resin fiber bundle wound into a roll. The melting temperature was set to a temperature which was 15° C. higher than the melting point of the thermoplastic resin.

Production of Commingled Yarn

The commingled yarn was produced according to the following method.

Each of fibers was unwounded from a roll of the thermoplastic resin fibers having a length of 1 m or greater and a roll of the continuous reinforcing fibers having a length of 1 m or greater, and spreading was performed by air-blowing while the fibers were passed through a plurality of guides. While spreading was performed, the thermoplastic resin fibers and continuous reinforcing fibers were bundled, and further, air blowing was performed while the bundle was passed through a plurality of guides to make the bundle uniform.

Regarding the obtained commingled yarn, the commingled yarn in which continuous carbon fibers (Pyrofil-TR-50S-12000-AD) were used had the fineness of approximately 13000 dtex and the number of fibers of approximately 13500 f; the commingled yarn in which high fineness continuous carbon fibers (Pyrofil-TRH50-60M) were used had the fineness of approximately 65000 dtex and the number of fibers of approximately 675000 f; and the commingled yarn in which continuous glass fibers were used had the fineness of approximately 15000 dtex and the number of fibers of approximately 10000 f.

The volume ratio of continuous thermoplastic resin fibers to continuous reinforcing fibers was 1:1.

Furthermore, regarding the proportion of the continuous reinforcing fibers, the commingled yarn in which continuous carbon fibers (Pyrofil-TR-50S-12000-AD) were used had the proportion of 61 mass %; the commingled yarn in which high fineness continuous carbon fibers (Pyrofil-TRH50-60M) were used had the proportion of 61 mass %; and the commingled yarn in which glass fibers were used had the proportion of 69 mass %.

Production of Material

One roll of the commingled yarn obtained above was placed on a creel, and one bundle was pulled out, and ultrasonic vibration was applied to the bundle under the following conditions, and the thermoplastic resin fibers of the surface were melted to obtain a material.

The obtained material had the width of 8 mm and the length of 100 m.

Ultrasonic Vibration Application Condition

The commingled yarn was moved in the longitudinal direction while being pressed against the supporting face of the supporting body by the press face of the vibrating horn, thereby melting the vicinity of the surface of the thermoplastic resin and forming the surface layer (the first region or the second region) shown in Table 1. Specifically, a vibrating horn was applied to one face of commingled yarn to form one surface layer (the first region), and the vibrating horn was then applied to the back face of the commingled yarn to form another surface layer (the second region). The applied pressure was 0.2 MPa, the frequency was 20 kHz, and the output was 2400 kW were used and the traveling speed was adjusted so that the surface layer (the first region or the second region) and the fiber region shown in Table 1 were present. The W3080, available from Nippon Future Co., Ltd. was used as the ultrasonic instrument. For Comparative Example 1, the thermoplastic resin was melted to the inside, and for Comparative Example 2, no ultrasonic treatment was performed.

Crystallization Energy During Temperature Increase of Material

Using a razor (Feather Hi-Stainless, available from FEATHER Safety Razor Co., Ltd), 5 mg of the thermoplastic resin component (including the thermoplastic resin and additives and the like that are optionally compounded) of the surface layer (the first region or the second region) was shaved off. Using a differential scanning calorimeter (DSC: DSC6200, available from SII), the shaved sample was heated from 25° C. to the temperature that was 20° C. higher than the melting point of the thermoplastic resin component at the temperature increase rate of 10° C./min in a nitrogen stream, and the crystallization energy during temperature increase was calculated from the detected crystallization peak.

Fiber region: The ultrasonic-treated commingled yarn was split in half, and 5 mg of the thermoplastic resin fibers at the central portion was collected. The collected sample was heated to the temperature that was 20° C. higher than the melting point of the thermoplastic resin fibers at the temperature increase rate of 10° C./min, and similarly, the crystallization energy during temperature increase was calculated from the detected crystallization peak.

"J/g" was used as the unit.

Observation of Cross Section of Material

The measurement sample (material) was cut out and embedded in an epoxy resin. A cross section perpendicular to the longitudinal direction of the embedded measurement sample was polished, and a cross-sectional view image was taken using an ultradeep color 3D geometry measurement microscope VK-9500 (controller section)/VK-9510 (measurement section) (available from Keyence Corporation).

Evaluation was performed as follows.

A: On the surface of the material, the thermoplastic resin fibers melted and formed a layered or film-like region, and in the inner part of the material, the thermoplastic resin fibers did not melt, and the majority of the thermoplastic resin fibers retained the fibrous condition.

B: No boundary was observed between the surface layer and the inner part.

Thicknesses of Surface Layer and Inner Part of Material and Thickness of Material Of the materials, any five positions were selected for the material in the condition A described above, and the average value of the thicknesses at the five positions was used as the total thickness of the material. Next, in the any five positions described above, in the thickness direction, a region where the proportion of the melted thermoplastic resin constituting the layered or film-like region was 90 area % or greater relative to the entire thermoplastic resin was defined as the surface layer (the first region or the second region), and the average thickness of the thicknesses at five points was used as the thickness of the surface layer (the first region, the second region). The thickness of the fiber region was determined by subtracting the thickness of the surface layer (the first region and the second region) from the total thickness of the material.

The thickness was measured from the images obtained by the cross section observation described above.

Density Ratio of Fiber Region to Theoretical Maximum Density

The density was calculated from the width of the material and the thickness of the fiber region, and the density ratio of the fiber region was calculated from the following equation.

Density ratio of fiber region=(density of fiber region)/(theoretical density)

Deformation Resistance Load (Suppleness)

Figure 5A:
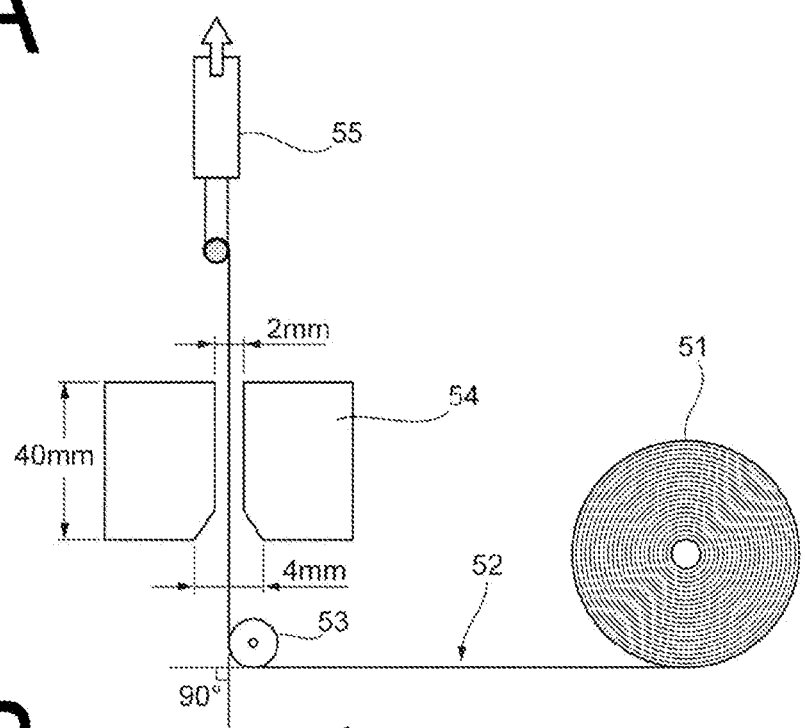
FIGS. 5A and 5B are schematic views of an apparatus for measuring a deformation resistance load in examples.
Figure 5B:
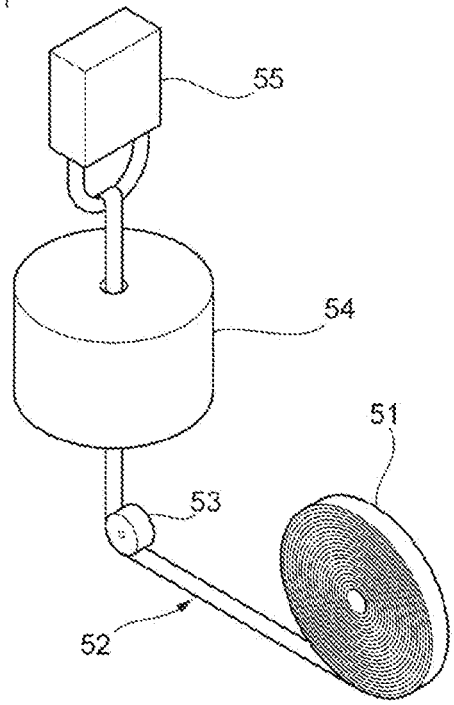

The deformation resistance load, which is an indicator of the suppleness required during textile fabrication, was measured. As illustrated in FIGS. 5A and 5B, the obtained material 52 was unwound from the roll 51, and the traveling direction of the material 52 was changed by 90° via the guide roll 53, the material 52 was then passed through a drawing jig 54 (produced by processing MC nylon, available from Quadrant) having a cylindrical passage with the dimensions illustrated in FIG. 5A, and the end thereof was fixed on a load meter 55. The load applied when the load meter 55 was pulled upward was measured as the deformation resistance load value. The deformation resistance load was measured by using the Strograph EII, available from Toyo Seiki Seisaku-sho, Ltd., and the lift rate was 300 mm/min. FIGS. 5A and 5B are schematic views of a device for measuring the deformation resistance load in examples. FIG. 5A is a cross sectional view, and FIG. 5B is a perspective view.

Thermal Shrinkage Ratio

Figure 6:
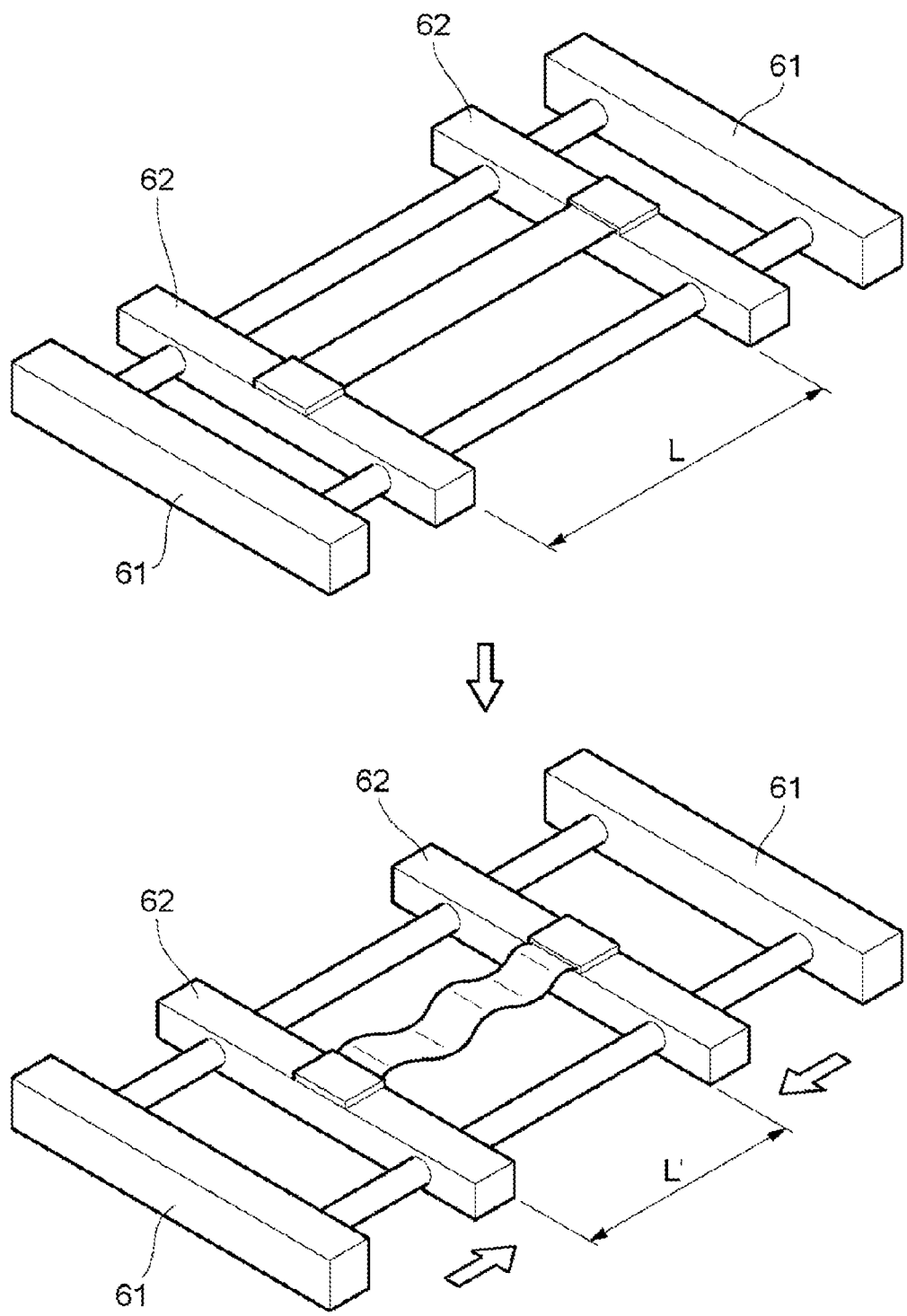
FIG. 6 is a schematic view of an apparatus for measuring a thermal shrinkage ratio in examples.

The thermal shrinkage ratio was measured by using the jig illustrated in FIG. 6. The fixing tools 61 at both ends do not move, and the fixing tools 62 therebetween slide without resistance. The obtained material 63 was attached on the fixing tools 62 by the gauge length (L) of 300 mm, and left to stand in a dry oven with the temperature that was 5° C. higher than the melting point of the thermoplastic resin fibers for 1 minute. Thereafter, the gauge length (L') was measured, and the thermal shrinkage ratio was measured by the following equation.

Thermal shrinkage ratio=(L−L')/L×100(%)

Production of Composite Material (Shape Retention)

Figure 7:
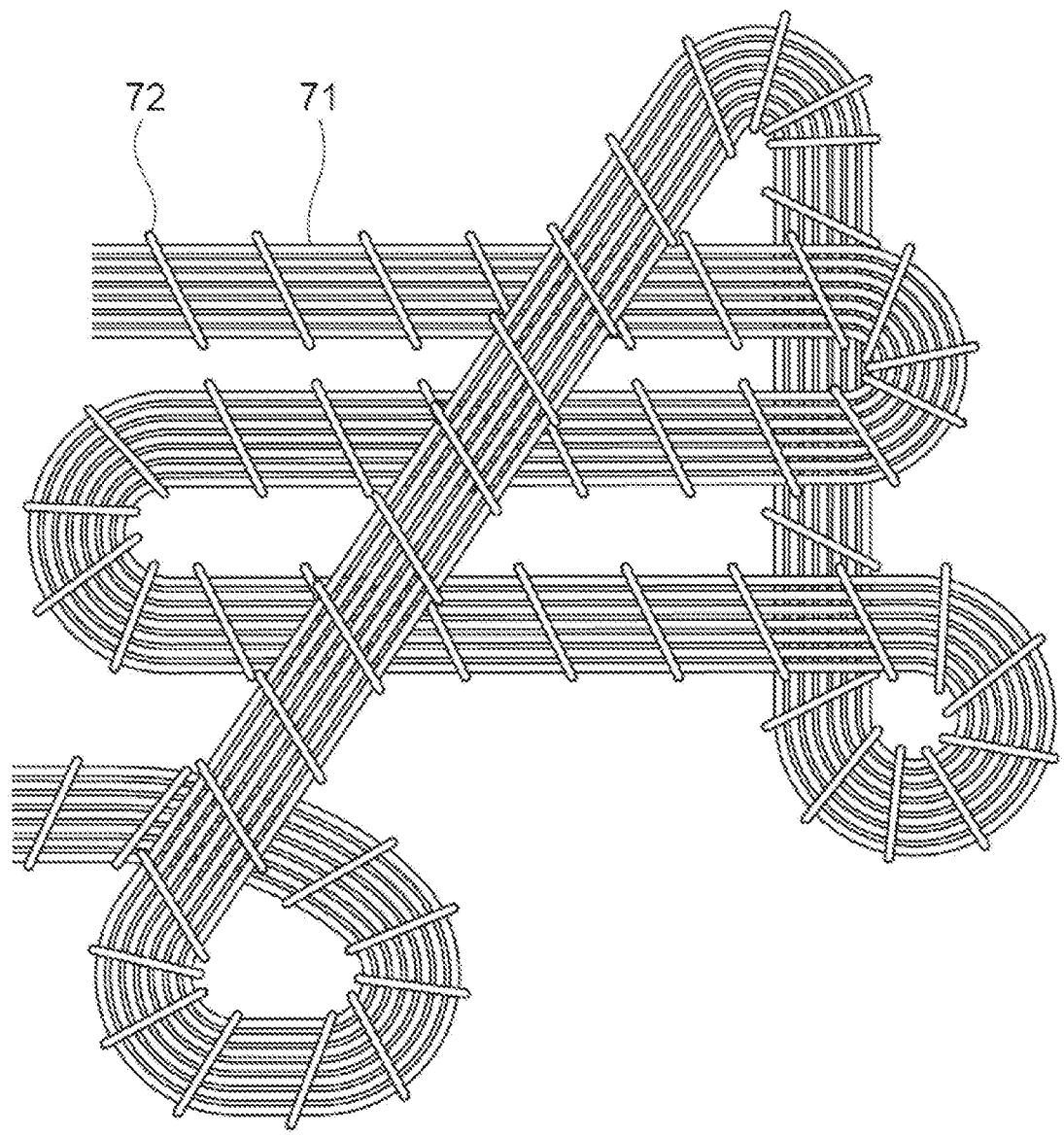
FIG. 7 is a schematic view illustrating an arrangement of a material for forming a composite material in examples.

The thermoplastic resin fibers for shape retention were produced in the same manner as in "Production of continuous thermoplastic resin fibers" described above by using the thermoplastic resin described in the "Thermoplastic resin fibers for retaining shape" section shown in Table 1. The materials obtained above were arranged on the polyamide 66 film for shape retention produced above as illustrated in FIG. 7, and the thermoplastic resin fibers 72 for shape retention were twisted to form two-ply yarn, and the commingled yarn was stitched onto the polyamide 66 film for shape retention to retain a shape. Thereby, a composite material was obtained. In FIG. 7, the reference sign 71 indicates a material according to an embodiment of the present invention, and the reference sign 72 indicates the thermoplastic resin fibers for retaining shape.

A: The shape of the material, including portions with a sharp curve, was appropriately retained.

B: The shape of the material was not appropriately retained, due to partial breakage of the material or the like.

Microwave Forming of Composite Material by Light Forming (Moldability)

The composite material obtained above was placed in a silicone rubber mold, inside of the rubber mold was evacuated, and the composite material was irradiated with infrared light from the outside of the rubber mold, and thus the thermoplastic resin was heated to 290° C. Irradiation of the infrared light was terminated, and cooling was performed. Applying the vacuum was stopped, and the product was removed from the rubber mold and thus a molded product was obtained. Evaluation was performed as follows.

A: A good molded product was obtained.

B: A good molded product was not obtained, due to molded product being shrunk and deformed during the microwave forming and the like.

C: The composite material was unsuitable for microwave forming and no light forming was performed.

Examples 2 to 6 and Example 8 and Comparative Examples 1 and 2

Changes from Example 1 were made as shown in Table 1 below, and others were performed in the same manner.

Example 7

A material was obtained by making changes from Example 1 as shown in the table. For the portions in which the first region sides of the surface layers of the two sheets of the obtained materials overlap, each 1 cm width portion (corresponding to 9% of the width of each material) was heated by laser, and the heated portions were partially welded. The heating temperature was 250° C., and the thickness of the welded portion was 30 μm.

TABLE 1

|  |  | Example 1 | Example 2 | Example 3 | Example 4 | Example 5 | Example 6 |
|---|---|---|---|---|---|---|---|
| Types of Continuous reinforcing fiber | | Carbon fiber | Carbon fiber | Carbon fiber | Glass fiber | — | Carbon fiber |
| Ratio of continuous reinforcing fibers (mass %) | | 61 | 61 | 61 | 69 | — | 61 |
| Observation of cross section of material | | A | A | A | A | A | A |
| Surface layer (first | Thermoplastic resin fiber type | MPXD10 | MXD10 | MXD6 | MPXD10 | MPXD10 | MPXD10 |
| | Thickness (μm) | 37 | 40 | 39 | 30 | 51 | 38 |

TABLE 1-continued

|  |  |  |  |  |  |  |  |
|---|---|---|---|---|---|---|---|
| region) | Crystallization energy during temperature increase of thermoplastic resin component (J/g) | 5.3 | 6.1 | 5.7 | 5.5 | 6.5 | 5.3 |
| Inner part (fiber region) | Thermoplastic resin fiber type | MPXD10 | MXD10 | MXD6 | MPXD10 | MPXD10 | MPXD10/MXD6 (mass ratio 1/1) |
|  | Thickness (μm) | 72 | 68 | 75 | 135 | 79 | 76 |
|  | Crystallization energy during temperature increase of thermoplastic resin fibers (J/g) | 0.3 | 0.6 | 0.5 | 0.3 | 0.4 | 0.3 |
|  | Theoretical density ratio | 2.3 | 2.2 | 2.4 | 4.3 | 2.6 | 2.4 |
| Surface layer (second region) | Thermoplastic resin fiber type | MPXD10 | MXD10 | MXD6 | MPXD10 | MPXD10 | MXD6 |
|  | Thickness (μm) | 41 | 44 | 42 | 28 | 65 | 44 |
|  | Crystallization energy during temperature increase of thermoplastic resin component (J/g) | 5.3 | 6.1 | 5.7 | 5.5 | 6.5 | 5.7 |
|  | Number of laminations of material (ply) | 1 | 1 | 1 | 1 | 1 | 1 |
|  | Total thickness of material (μm) | 150 | 152 | 156 | 193 | 195 | 158 |
|  | Deformation resistance load (N) | 0.5 | 0.7 | 0.6 | 0.4 | 0.3 | 0.6 |
|  | Thermal shrinkage ratio (%) | 0 | 0 | 0 | 0.1 | 0 | 0 |
|  | Thermoplastic resin fibers for shape retention | MXD6 | MXD6 | PA66 | MXD6 | MXD6 | PA66 |
|  | Production of composite material (shape retention) | A | A | A | A | A | A |
|  | Microwave forming of composite material (moldability) | A | A | A | A | A | A |

|  |  | Comparative Example 1 | Comparative Example 2 | Example 7 | Example 8 |
|---|---|---|---|---|---|
|  | Types of Continuous reinforcing fiber | Carbon fiber | Carbon fiber | Carbon fiber | High fineness carbon fiber |
|  | Ratio of continuous reinforcing fibers (mass %) | 61 | 61 | 61 | 61 |
|  | Observation of cross section of material | B | B | A | A |
| Surface layer (first region) | Thermoplastic resin fiber type | MPXD10 | MPXD10 | MPXD10 | MPXD10 |
|  | Thickness (μm) | No boundary | No boundary | 37 | 31 |
|  | Crystallization energy during temperature increase of thermoplastic resin component (J/g) | 5.3 | 0.4 | 5.3 | 4.8 |
| Inner part (fiber region) | Thermoplastic resin fiber type | MPXD10 | MPXD10 | MPXD10 | MPXD10 |
|  | Thickness (μm) | No boundary | No boundary | 72 | 106 |
|  | Crystallization energy during temperature increase of thermoplastic resin fibers (J/g) | 5.3 | 0.3 | 0.5 | 0.2 |
|  | Theoretical density ratio | — | — | 2.1 | 2.9 |
| Surface layer (second region) | Thermoplastic resin fiber type | MPXD10 | MPXD10 | MPXD10 | MPXD10 |
|  | Thickness (μm) | No boundary | No boundary | 41 | 33 |
|  | Crystallization energy during temperature increase of thermoplastic resin component (J/g) | 5.3 | 0.4 | 5.2 | 4.9 |
|  | Number of laminations of material (ply) | 1 | 1 | 2 | 1 |
|  | Total thickness of material (μm) | 72 | 281 | 285 | 170 |
|  | Deformation resistance load (N) | 1.4 | 0.1 | — | — |
|  | Thermal shrinkage ratio (%) | 0 | 12 | 0 | 0 |
|  | Thermoplastic resin fibers for shape retention | MXD6 | MXD6 | MXD6 | MXD6 |
|  | Production of composite material (shape retention) | B | B | A | A |
|  | Microwave forming of composite material (moldability) | C | B | A | A |

As is clear from the results described above, in the cases where the material according to an embodiment of the present invention was used (Examples 1 to 6 and 8) and in a case where the partially welded material according to an embodiment of the present invention was used (Example 7), materials that were supple and had low thermal shrinkage ratios were obtained. Furthermore, a good molded product was obtained from the composite material obtained by retaining the shape of the material. In particular, it was found that the material and the partially welded material according to an embodiment of the present invention are supple and have a low thermal shrinkage ratio, and therefore are suitable for producing complex, fine shaped molded products.

On the other hand, in a case where the crystallization energy during temperature increase of the thermoplastic resin fibers in the inner part was large (Comparative Example 1), the material obtained did not have distinguishable surface layer and the inner part, and lacked suppleness. Therefore, the material was susceptible to break at the bent portion, and exhibited difficulty in retaining its shape. Furthermore, in a case where the crystallization energy during temperature increase of the thermoplastic resin component of the surface layer was small (Comparative Example 2), dimensional change could not be suppressed, and the thermal shrinkage ratio was high. Furthermore, the material was not bundled and was fluffy, and exhibited difficulty in retaining its shape.

REFERENCE SIGNS LIST

1 First region
2 Fiber region
3 Second region
21 First region
22 Second region
23 Fiber region
31 Mold
32 Material
33 Light
34 Molded product
41 Composite material
42 Material
43 Second thermoplastic resin fiber
44 Thermoplastic resin film
51 Roll
52 Material
53 Guide roll
54 Drawing jig
55 Load meter
61 Fixing tool
62 Fixing tool
63 Material
71 Material
72 Thermoplastic resin fiber for shape retention
81 Welded portion

The invention claimed is:

1. A material comprising:
a first region, a fiber region, and a second region continuously in a thickness direction;
the first region and the second region being each independently a resin layer including from 20 to 100 mass % of a thermoplastic resin component and from 80 to 0 mass % of reinforcing fibers;
the fiber region including from 20 to 100 mass % of thermoplastic resin fibers and from 80 to 0 mass % of reinforcing fibers;
the thermoplastic resin component included in the first region and the thermoplastic resin component included in the second region each independently having a crystallization energy during temperature increase of 2 J/g or greater, measured by differential scanning calorimetry; and
the thermoplastic resin fibers included in the fiber region having a crystallization energy during temperature increase of less than 1 J/g, measured by differential scanning calorimetry; wherein
the crystallization energy during temperature increase is a value measured by using a differential scanning calorimeter (DSC) in a nitrogen stream while heating is performed from 25° C. to a temperature that is 20° C. higher than a melting point of the thermoplastic resin component or the thermoplastic resin fibers at a temperature increase rate of 10° C./min,
wherein a thickness of the fiber region relative to a total thickness of the material is 20% or greater.

2. The material according to claim 1, wherein 80 mass % or greater of compositions of the thermoplastic resin component included in the first region, the thermo-plastic resin component included in the second region, and the thermoplastic resin fibers included in the fiber region are identical to each other.

3. The material according to claim 1, wherein the thermoplastic resin component included in the first region, the thermoplastic resin component included in the second region, and the thermoplastic resin fibers included in the fiber region each independently include a polyamide resin.

4. The material according to claim 1, wherein the thermoplastic resin component included in the first region, the thermoplastic resin component included in the second region, and the thermoplastic resin fibers included in the fiber region each independently include a polyamide resin including a constituent unit derived from diamine and a constituent unit derived from dicarboxylic acid, and 50 mol % or greater of the constituent unit derived from diamine is derived from xylylenediamine.

5. The material according to claim 1, wherein the fiber region includes from 25 to 80 mass % of thermoplastic resin fibers and from 75 to 20 mass % of reinforcing fibers.

6. The material according to claim 5, wherein the reinforcing fibers include at least one selected from the group consisting of carbon fibers and glass fibers.

7. The material according to claim 5, wherein the reinforcing fibers are continuous reinforcing fibers.

8. The material according to claim 7, wherein the fiber region includes commingled yarn including the continuous reinforcing fibers and the thermoplastic resin fibers.

9. The material according to claim 7, wherein the first region and the second region are formed from commingled yarn including the continuous reinforcing fibers and the thermoplastic resin fibers.

10. The material according to claim 1, wherein the first region, the second region, and the fiber region each independently include from 25 to 80 mass % of a thermoplastic resin component and from 75 to 20 mass % of reinforcing fibers.

11. The material according to claim 10, wherein a difference in mass portion among the reinforcing fibers included in the first region, the second region, and the fiber region is 5 mass % or less.

12. The material according to claim 1, wherein a difference between the crystallization energy during temperature increase of the thermoplastic resin component included in the first region and the crystallization energy during temperature increase of the thermoplastic resin fibers included in the fiber region and a difference between the crystallization energy during temperature increase of the thermoplastic resin component included in the second region and the crystallization energy during temperature increase of the thermoplastic resin fibers included in the fiber region are each independently 3 J/g or greater.

13. The material according to claim 1, wherein the material is a material for light forming or a material for microwave forming.

14. The material according to claim 1, wherein a deformation resistance load is 1 N or less,
the deformation resistance load being a load applied to the material to pull the material up at a rate of 300 mm/min through a guide that changes a traveling direction of the material by 90 degrees.

15. The material according to claim 1, wherein a thermal shrinkage ratio after heating is performed at a temperature that is 5° C. higher than the melting point of the thermoplastic resin fibers for 1 minute is 1% or less.

16. The material according to claim 1, wherein the material is in a tape shape.

17. A partially welded material in which at least two materials described in claim 1 are partially welded.

18. A composite material comprising:
the material described in claim 1, and second thermoplastic resin fibers that retain a shape of the material or a partially welded material; wherein the second thermoplastic resin fibers have a melting point that is at least 15° C. higher than a melting point of thermoplastic resin fibers included in the material or the partially welded material.

19. A method for producing a material, the method comprising;
provided a material comprising a first region, a fiber region, and a second region continuously in a thickness direction,
the first region and the second region being each independently a resin layer including from 20 to 100 mass % of a thermoplastic resin component and from 80 to 0 mass % of reinforcing fibers,
the fiber region including from 20 to 100 mass % of thermoplastic resin fibers and from 80 to 0 mass % of reinforcing fibers,
the thermoplastic resin component included in the first region and the thermoplastic resin component included in the second region each independently having a crystallization energy during temperature increase of 2 J/g or greater, measured by differential scanning calorimetry, and
the thermoplastic resin fibers included in the fiber region having a crystallization energy during temperature increase of less than 1 J/g, measured by differential scanning calorimetry, wherein
the crystallization energy during temperature increase is a value measured by using a differential scanning calorimeter (DSC) in a nitrogen stream while heating is performed from 25° C. to a temperature that is 20° C. higher than a melting point of the thermoplastic resin component or the thermoplastic resin fibers at a temperature increase rate of 10° C./min; and
applying ultrasonic vibration on a surface of fibers arranged in at least one direction, the fibers including from 20 to 100 mass % of thermoplastic resin fibers and from 80 to 0 mass % of reinforcing fibers.

20. A method for producing a molded product, the method comprising:
providing a material comprising a first region, a fiber region, and a second region continuously in a thickness direction,
the first region and the second region being each independently a resin layer including from 20 to 100 mass % of a thermoplastic resin component and from 80 to 0 mass % of reinforcing fibers,
the fiber region including from 20 to 100 mass % of thermoplastic resin fibers and from 80 to 0 mass % of reinforcing fibers,
the thermoplastic resin component included in the first region and the thermoplastic resin component included in the second region each independently having a crystallization energy during temperature increase of 2 J/g or greater, measured by differential scanning calorimetry, and
the thermoplastic resin fibers included in the fiber region having a crystallization energy during temperature increase of less than 1 J/g, measured by differential scanning calorimetry, wherein
the crystallization energy during temperature increase is a value measured by using a differential scanning calorimeter (DSC) in a nitrogen stream while heating is performed from 25° C. to a temperature that is 20° C. higher than a melting point of the thermoplastic resin component or the thermoplastic resin fibers at a temperature increase rate of 10° C./min; and
subjecting the material to light forming or microwave forming.

* * * * *

UNITED STATES PATENT AND TRADEMARK OFFICE
CERTIFICATE OF CORRECTION

PATENT NO. : 11,499,022 B2  
APPLICATION NO. : 16/493521  
DATED : November 15, 2022  
INVENTOR(S) : Asami Nakai et al.

Page 1 of 1

It is certified that error appears in the above-identified patent and that said Letters Patent is hereby corrected as shown below:

In the Claims

In Column 33, Line 6:
In Claim 19, please delete "comprising;" and insert -- comprising: --, therefor.

Signed and Sealed this
Thirtieth Day of January, 2024

Katherine Kelly Vidal
*Director of the United States Patent and Trademark Office*